United States Patent [19]
Hashemi et al.

[11] Patent Number: 5,396,596
[45] Date of Patent: Mar. 7, 1995

[54] MASS DATA STORAGE AND RETRIEVAL SYSTEM PROVIDING MULTIPLE TRANSFER PATHS WITH MULTIPLE BUFFER MEMORIES

[75] Inventors: Seyed H. Hashemi, Mission Viejo; Khorvash Sefidvash, Laguna Niguel, both of Calif.

[73] Assignee: Unisys Corporation, Blue Bell, Pa.

[21] Appl. No.: 228,489

[22] Filed: Apr. 15, 1994

Related U.S. Application Data

[62] Division of Ser. No. 949,280, Sep. 22, 1992, Pat. No. 5,337,414.

[51] Int. Cl.6 .................. G06F 13/14; G06F 13/38
[52] U.S. Cl. .......................... 395/250; 364/940.81; 364/927.92; 364/239
[58] Field of Search ............ 395/200, 250, 325, 800

[56] References Cited

U.S. PATENT DOCUMENTS

| | | | |
|---|---|---|---|
| 3,755,785 | 8/1973 | Kirk | 395/275 |
| 4,032,899 | 6/1977 | Jenny | 395/325 |
| 4,075,691 | 2/1978 | Davis | 395/275 |
| 4,181,936 | 1/1980 | Kober | 395/200 |
| 4,207,609 | 6/1980 | Luiz | 395/325 |
| 4,209,840 | 6/1980 | Berardi | 395/200 |
| 4,509,115 | 4/1985 | Manton | 395/325 |
| 4,695,952 | 9/1987 | Howland | 395/325 |
| 4,853,846 | 8/1989 | Johnson | 395/325 |
| 4,875,037 | 10/1989 | Escolar | 340/825.07 |
| 4,967,347 | 10/1990 | Smith | 395/575 |

FOREIGN PATENT DOCUMENTS

| | | | |
|---|---|---|---|
| 0077153 | 4/1983 | European Pat. Off. | G06F 11/20 |
| 0248906 | 12/1987 | Japan | G06F 12/00 |

Primary Examiner—David Y. Eng
Attorney, Agent, or Firm—Alfred W. Kozak; Mark T. Starr; Stanton D. Weinstein

[57] ABSTRACT

A mass storage/retrieval module for controlling the storage and retrieval operations of massive amounts of data in peripheral devices such as tape, disk, optical, etc. provides for a buffer memory system in each of the interface control modules which permit simultaneous and concurrent writing to buffer storage and reading out of buffer storage through multiple ports for high rates of data transfer operations. Redundancy and high reliability is provided in that each module of the system has dual busses and live replacement units such that, upon failure, an alternate unit can carry the circuitry requirements until the failing unit has been replaced.

10 Claims, 13 Drawing Sheets

FIG. 8 ⬚ SHOWS THE PORT CONNECTED TO WHICH MODULE
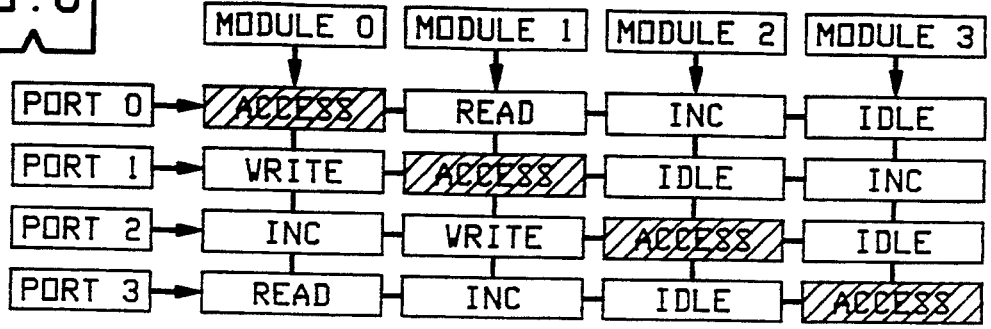
FIG. 8A FIRST SYSTEM CYCLE
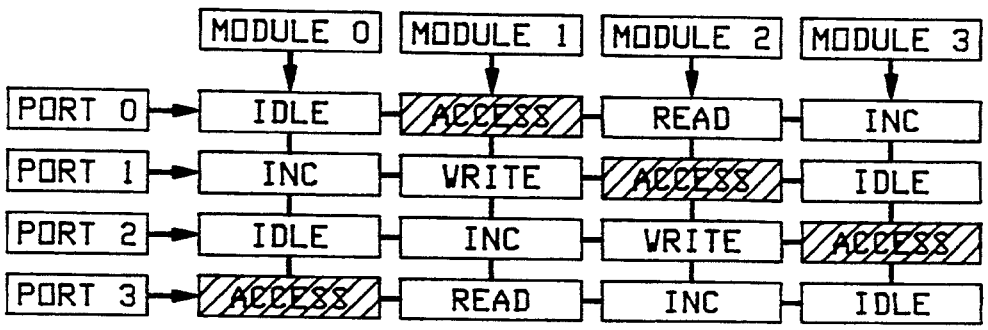
FIG. 8B SECOND SYSTEM CYCLE
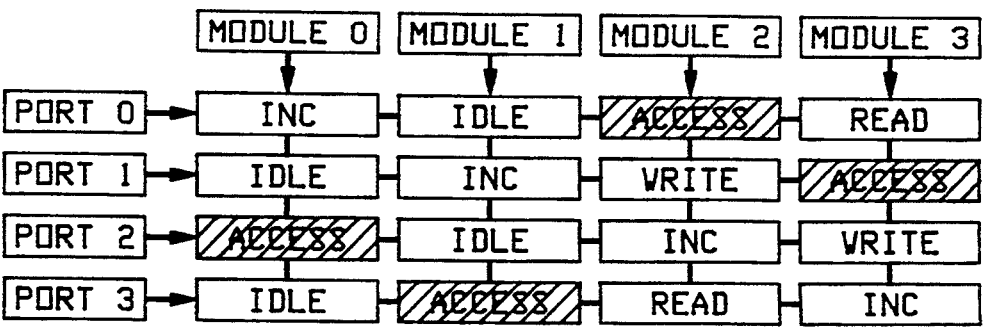
FIG. 8C THIRD SYSTEM CYCLE
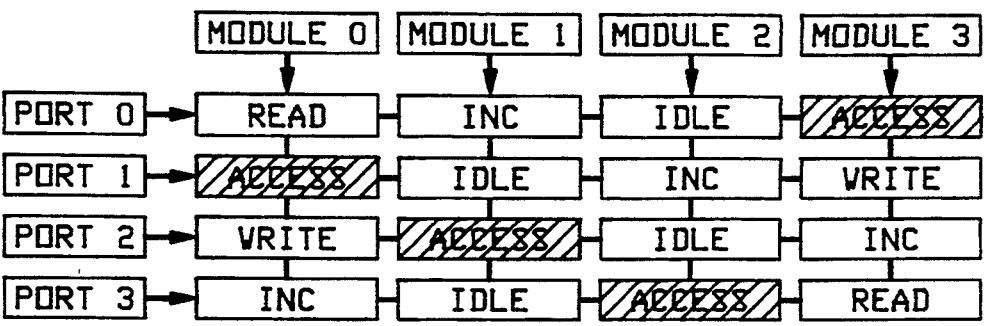
FIG. 8B SECOND SYSTEM CYCLE

MASS DATA STORAGE AND RETRIEVAL SYSTEM PROVIDING MULTIPLE TRANSFER PATHS WITH MULTIPLE BUFFER MEMORIES This is a divisional of application(s) Ser. No. 07/949,280, filed on Sep. 22, 1992, now U.S. Pat. No. 5,337,414.

FIELD OF THE INVENTION

This disclosure involves control systems providing configurations for mass storage using various types of peripherals such as disk, tape or optical drives.

CROSS REFERENCES TO RELATED APPLICATIONS

This application is related to co-pending applications U.S. Ser. No. 898,633 filed Jun. 15, 1992, entitled Universal Power Distribution System, and U.S. Ser. No. 948,381, filed Sep. 21, 1992 entitled "Multiported Buffer Memory System for Disk Drive Complex" which applications are included herein by reference.

BACKGROUND OF THE INVENTION

Continued development and upgrading of magnetic disk subsystems lead to the desirable features of higher performance, greater capacity, higher reliability, more connectivity, in addition to reduced power consumption, reduced footprint area, and reduced heat dissipation.

As seen in FIG. 1B, the general block diagram of the present mass storage and retrieval system would include a host processor 4 for several interface modules such as channel interface module $8_c$ (CIM) and device interface module $8_d$ (DIM) connected to a plurality of disk drive units 70 or other types of peripheral storage devices. The particular interfaces in various types of mass storage systems will vary according to the individual design of the manufacturer. In the present described architecture, the interfaces involve two particularly efficient interfaces known as the channel interface module $8_c$ which uses the later described buffer memory of the mass storage system and also a device interface module (DIM) $8_d$ which also uses the herein described buffer memory system configuration.

In the prior art and other conventional memory systems, where buffer memories were used in interfaces for Read, Write, and other operations in mass storage systems, the requirement of time multiplexing of the memory caused undesirable wait periods for accessing by the numerous sources which had to access the memory.

As an example, buffer memories would normally be accessed by various sources such as a host processor, a control processor, and by various data channels which communicated to a series of peripheral storage units. It was the problem of delay and of waiting for taking of turns for each of these particular outlying sources in accessing the buffer memory, that created and caused unacceptable delays.

When dual port buffer memories were used, this not only increased the cost, the amount of board surface involved, but also increased power usage on the board in addition to causing contention between the two ports of each memory. Even in this case, there were two sources of access which still had to wait for their turn for memory access and attention.

In order to reduce the use of power consumption and to reduce the amount of board surface required and especially to keep the simplicity as well as the "fairness of access" to all of the sources available, the present architecture for a storage and retrieval system providing massive data storage having rapid access and retrieval on a simultaneous and concurrent basis using multiple peripheral storage devices, has been designed to overcome the aforementioned limitations. Further, redundancy of buses, power supplies and faulty module replacement without shutdown, allows uninterruptible access to stored information.

GENERAL OVERVIEW

A more highly efficient and less costly data storage and retrieval system for mass storage is indicated in FIG. 1B. FIG. 1A shows one-half of the overall system in order to illustrate the flexibility and operability. A complete mass storage configuration would include twice the number of CIM and DIM controller boards shown in FIG. 1A.

As seen in FIG. 1A, there are four controller boards, two of which ($8_{c1}$, $8_{c2}$) are the channel interface module (CIM) controller boards which use a specialized multiported buffer, and there is also shown in FIG. 1A two device interface module (DIM) controller boards ($8_{d1}$, $8_{d2}$) which also use the specialized multiported buffer.

A fully configured system would have eight interface controller boards so that in FIG. 1A there would be four channel interface module boards (CIM) and four device interface module (DIM) boards.

Within each of the eight controller boards (of which four are shown in FIG. 1A), there is seen the buffer memory systems $24_{c1}$, $24_{c2}$, and $24_{d1}$, and $24_{d2}$) wherein each of these buffer memory systems have four ports designated as $P_0$, $P_1$, $P_2$, and $P_3$.

As will be described hereinafter, all the individual memory modules used in the multiported buffer memory are single ported static RAMs which are cheaper yet more dense and smaller in terms of usable space than multiport static RAMs.

The presently described mass data storage system consists of a family of stand alone data storage systems. These are attachable to certain Unisys Corporation host systems by means of a fiber channel interface and block MUX channel (BMC) and (IPI) intelligent peripheral interface or by an industry standard small computer systems interface (SCSI).

Each individual sub-system is self-contained within a single cabinet and may consist of a unit called a Control Module Rack (CMR) and from 1 to 8 Data Storage Racks (DSR) which may be any combination of magnetic disk, optical disk, cache memory, or even magnetic tape based storage units.

Various functional control module rack (CMR) configurations permit any combination of Channel Interface Modules (CIM) and Device Interface Modules (DIM), configured up to a maximum of 8 separate modules.

A configuration of 4 CIMs and 4 DIMs will provide 8 host ports and 16 SCSI buses.

Data storage capacity (unformatted) for the "disk-only" version is expandable from a basic 2.3 gigabytes (single disk drive) to 128 gigabytes (56 dual ported disk drives configured with seven drives per dual SCSI bus.

Additionally, the disk-only option can be arranged to support a RAID technology which functions as a redundant array of inexpensive disks. This can be done in the RAID space "0" (Simplex) and also in a RAID 3 and modified RAID 5 (parallel array) configuration.

The presently described mass storage subsystem has the capability for fully redundant operation and is provided with "live replacement" modules for all subsystems such as the power system, power control system, data channels and storage devices. This permits virtually uninterruptible access to stored information. Thus data loss in such a redundant configuration is virtually eliminated.

The CMR or Control Module Rack contains all the hardware logic required to manage and control the data storage and the mass storage subsystem. The Control Module Rack is a fully self-contained rack module which holds the following modular components. (i) two power supplies (AC to DC); (ii) channel interface modules (CIM); (iii) device interface modules (DIM); (iv) Futurebus Central Arbiter Module, (two each); (v) Futurebus Backplane Assembly.

A total of eight standard CIM and DIM modules can be mounted in the Control Module Rack.

The interface control logic modules designated as the CIM and the DIM are located in the Control Module Rack and communicate with each other by means of the industry standard IEEE Futurebus Plus Interface. The CIM modules provide communication to the Host System via a fiber channel interface using the federal standard FIPS 97 protocol (Federal Information Processing Standards Protocol), or BMC (Block Multiplexer Channel) or IPI (Intelligent Peripheral Interface) or via the industry standard SCSI interface.

The device interface modules (DIM) provide control and communication with the data storage devices in the Data Storage Rack (DSR) by means of the industry standard SCSI-2 Interface. All of the active components and modules of the control module rack (CMR) are designed for live replacement together with full fault notification to the host system to permit on-line maintenance capability.

Power regulated DC power (for the CIM/DIM modules located in the Control Module Rack) are provided by two AC-DC power converter modules. These power modules operate as a parallel redundant pair, normally sharing the power load of the Control Module Rack.

In the event of failure of either power module the other power module automatically assumes the full load of the Control Module Rack until replacement of the faulty module can be affected. Failure information is also sent to the host system to alert it that module replacement is required. The "live replacement" capability of the power modules assures that there will uninterrupted operation of the control module rack CMR in the event of a power module failure without need to shutdown the system.

The Futurebus Backplane Assembly consists of two 32-bit wide, fully independent backplane data buses, each having associated Futurebus control bus lines. In the event of a fault on one of the buses, control processor (in each CIM, DIM) will automatically reconfigure in order to utilize single bus operation and continue to operate even though in a reduced band width mode. Within the Channel Interface Module (CIM), there is provided a Fiber Channel Interface Module which provides communication with the host system by means of a fiber channel interface. Two simultaneously usable channel connections are provided as standard operating functions. Communications with other channel interface modules (CIM) and other device interface modules (DIM) within the mass storage subsystem is done using the industry standard Futurebus Interface.

In addition to providing host communication functions, the CIM module also provides control and management of the Futurebus interface and management of all commands issued through its fiber channel interface. The connection between a host and a peripheral data storage device during execution of a command, is defined as a "logical path".

A "logical path", within the subsystem segment, consists of a CIM module and a DIM module, interconnected by the Futurebus Backplane Assembly, and the connection from the Device Interface Module (DIM) to the peripheral storage devices via the SCSI-2 Interface Bus.

An alternative or optional additive type of channel interface module (CIM) is designated as the SCSI channel interface module. This module provides communication with the Host System 4 via the industry standard SCSI-2 interface. Two channel connections are provided as standard. Other functions of the SCSI-CIM are identical to that of the fiber channel version of the channel interface module (CIM).

The disk device interface module (DIM) provides communication, in a RAID Simplex mode, with the data storage devices connected to the mass storage subsystem by using the industry standard SCSI-2 interface. Four SCSI interface connections are provided as a standard. Communication with other CIM and DIM modules within the mass storage subsystem is done using the industry standard Futurebus Interface.

In addition to providing device communication functions, the DIM module also provides control/management of the Futurebus Interface and functions as a Host Adaptor and a SCSI Initiator for all received commands. Each individual Disk Device Interface Module (DIM) can function as a magnetic disk control or as an optical disk control. The functional characteristics involved are determined by the DIM microcode, which is downloadable from the Host System via a CIM/Futurebus connection.

One configuration of the device interface module (DIM) is designated as the RAID device module which provides communication, in a RAID 3 or modified RAID 5 mode, with magnetic disk data storage devices within the subsystem by means of the industry standard SCSI-2 interface.

The use of the RAID-DIMs require additional space within the control module rack (CMR) above the space required for a standard device interface module (DIM).

The Data Storage Rack (DSR) or Disk Data Storage Rack contains all the hardware required for installation and support of a disk type data storage module in the subsystem. The control module rack (CMR) is a fully self-contained rack module which consists of the following components: (i) two power supplies; (ii) magnetic disk data modules (MDM) which may involve from 1 to 7 units; (iii) optical disk data modules (ODM), one, two, or four, depending on size; (iv) a SCSI-2 bus backplane assembly.

A total of 7 MDM or ODM modules in any combination can be mounted in the data storage rack (DSR).

The Data Modules (MDM and ODM) in the data storage module (DSR) communicate with the DIMs in the control module racks (CMR) by means of the industry standard SCSI-2 interface. Each Data Module has dual SCSI-2 ports and can communicate with two DIM modules via dual SCSI-2 buses.

Two fully independent SCSI-2 Bus subsystems are implemented within each data storage rack DSR. Regulated DC power is provided by redundant power supplies to all the data modules in the data storage rack. Again, all active components and modules are designed for live replacement without shutdown with full fault notification to the host system to permit on-line maintenance capability.

The SCSI-2 Bus Backplane Assembly (SBA) consists of the printed circuit type of backplane having two SCSI-2 buses and a power distribution bus. In event of a fault on one of the SCSI-2 interface buses, a control processor in each CIM and DIM module automatically reconfigures that bus pair for single port operation and continues to operate in a reduced capability mode. The SCSI-2 bus interfaces are contained within the data storage rack (DSR).

The Magnetic Disk Data Storage Module (MDM) consists of one $5\frac{1}{4}$ or $3\frac{1}{2}$ inch extended form factor, dual ported SCSI-2 magnetic disk drive. This drive module is physically and electrically configured for "live insertion" into the SCSI Bus Interface Module Backplane. No cables are required. Up to 7 data storage modules may be installed in a data storage rack (DSR).

Using 8 data storage racks this would provide a total of 56 magnetic disk storage modules for a full configuration. This live replacement capability of a data storage module assures uninterrupted operation of a data storage rack in the event a module must be replaced.

The power distribution module (PDM) of the system consists of dual independent Power Distribution Units (PDU) which are mountable or removable within the cabinet. The PDM has two independent AC Power Input Cables, one for each power distribution unit (PDU).

Remote power sequencing and emergency power-off capability (in accordance with FIPS 61) is also provided for the data storage rack (DSR). All active components in the power distribution module (PDM) have live replacement capability together with full fault notification to the host system for uninterrupted operation.

The Power Distribution Unit (PDU) provides control, fault monitoring and distribution of AC Power to the various modules within the cabinet. Regulated DC power and also low voltage AC power for the control unit and FIPS-61 modules are also provided. In the event of failure of either power distribution unit (PDU), then the other PDU will automatically assume the full load of this subsystem until replacement of the faulty module can be effectuated. This live replacement capability assures uninterrupted operation in the event of a power component failure. Each PDU has a Control Module which provides sequence control functions and fault monitoring for the power distribution unit (PDU).

In the presently described embodiment, the buffer memory system is provided with four ports of 36-bits data width. Each and every one of the ports can access the entire memory in each of the memory modules of the buffer memory system.

Operationally the maximum wait period for any first access is 350 nanoseconds and then the access to the next following data words will be operable at 80 megabytes per second for the entire burst size. The burst size can be from one word to a maximum of the entire size of the memory system modules which is 64 megabytes.

With the use of a multiport memory system in which the described embodiment of FIG. 1A shows four ports, the information in the buffer memory system is shared between a control processor ($10_{c1}$, $10_{c2}$, $10_{d1}$, $10_{d2}$) and two Future bus interfaces 31, 32 (FB1, FB2) plus the interface processors such as $IP_{c1}$, $IP_{c2}$, $IP_{d1}$, $IP_{d2}$) which respectively provide interfaces to the host computer and to the device interfaces for the multiple peripheral storage devices.

As seen in FIG. 2, the buffer memory system is shown in more detail in conjunction with one controller board that is to say, the DIM device interface module controller board 8a. Each of the ports $P_0$, $P_1$, $P_2$, $P_3$ of FIG. 2 (26, 27, 28, 25) has a transfer capability of 80 megabytes per second. FIG. 3 shows a block diagram of the internal elements of the buffer memory system. The use of address-transfer VLSI circuits ($24_a$) and data transfer VLSI circuits ($24_d$) are operable to reduce the power requirements of the system as well as the amount of board space and cost.

Each of the ports $P_0$, $P_1$, $P_2$, and $P_3$ is capable of handling 27-bits of Address Bus, 36-bits of Data Bus, and 6-bits of Control Bus.

There are four memory modules in FIG. 3 ($24_{m0}$, $24_{m1}$, $24_{m2}$, $24_{m3}$) which are addressed with the least significant bits of port addresses such that module 0 will hold all addresses ending in 00, module 1 will hold all addresses ending in 01 and module 2 will hold all addresses ending with 10 and module 4 will hold all addresses ending in 11.

The buffer memory system interconnections are shown in FIG. 4 where each memory module is seen to be connected to a port no matter what the status is of that port. This provides for equal access (fairness) to all ports within four system cycles wherein each system cycle takes a period of 50 nanoseconds.

FIG. 5 shows the Address Transfer Logic (VLSI) portion $24_a$ of the buffer memory system. It is seen that the address of each port is kept separately in a counter ($C_0$, $C_1$, $C_2$, $C_3$) which will then multiplex this address into each of the other module address ports. For one system cycle, the module addresses are all kept within each of the multiplexer units $24_{x0}$, $24_{x1}$, $24_{x2}$, $24_{x3}$) shown in FIG. 5.

FIG. 6 shows the Data Transfer Logic portion (VLSI) $24_d$ of the buffer memory system. It will be noted that there are two independent paths for each port making it possible to individually read or to write simultaneously into the buffer at the same time.

Each one of the bus interface input/output units ($24_t$, $24_i$) (BI-I/O) will be stable for at least one system cycle.

Each memory module ($24_c$, $24_d$) is made up of four virtual module units constructed as shown in FIG. 7. To hold a capacity of four megabytes of 36-bit words, there are used nine static RAM chips, each of which is 256K×by 4 bytes. Thus the nine RAM chips provide 262,144 words of 36 bits each per virtual module for a total of 1,048,576 words of 36 bits each. Here, the 1,048,576 words of 36 bits each is the equivalent of 4,194,304 bytes (4 megabytes).

SUMMARY OF THE INVENTION

A single host computer or multiple numbers of host computers may be connected to control module interfaces which permit high speed storage of masses of data on various types of peripherals such as disk drives, optical drives and/or tape drives.

The control module interfaces include a channel interface module (CIM) which interconnects to the host system for taking communications from the host system and transferring them across an internal bus to a peripheral device interface module (DIM).

The peripheral device interface module (DIM) is used to communicate between the physical data storage peripheral devices involved and the internal bus (Futurebus) connecting the device interface module and the channel interface module (CIM).

Each of the controller boards involving the channel interface module (CIM) and the device interface module (DIM) include high speed transfer multi-ported buffer units which permit the storage and transfer of data, both simultaneously on a Reading and Writing basis such that the multiple number of ports in a buffer memory system, within each controller board, permit access to a multiple number of memory modules in the buffer memory system.

Thus within each one of the CIM and the DIM control modules, the multi-ported buffer memory within each controller module permits simultaneous and concurrent writing storage of data while at the same time reading out of stored data. Within each of the buffer memory system modules (of which there are a multiple number M of modules), the system permits any one of the four input ports to the buffer memory system to access any one of the multiple number of memory modules within the buffer memory system for carrying out the functions of simultaneously reading out data and writing in data on a continuous basis.

The mass data storage system is made up of a number of individual subsystems where each subsystem is self-contained within a single cabinet and this cabinet consists of one Control Module Rack (CMR) and from one to eight Data Storage Racks (DSR) which house any combination of magnetic disk units, optical disk units, cache memory or magnetic tape base storage units. The subsystem is so arranged that it has the capability of fully redundant operation such that, during operations, it is possible to replace any module in any of the subsystems without interrupting the data transfer operations or the access to the stored information. Thus data loss in such a redundant configuration is practically eliminated.

Additionally, a plurality of power supplies for the control module rack (CMR) is provided so that they operate as a parallel redundant pair of power supplies which share the power load. And in the event of failure of either module, the other power module will automatically assume the full load of the control module rack (CMR) until replacement of the faulty module is effectuated.

The present invention also provides a large capacity buffer memory of four memory modules which permit exceedingly rapid transfer of data and simultaneously permit the Reading and Writing of data into and out of the memory modules from any one of the four ports of a multiport memory system.

In the preferred embodiment the multiport buffer memory system provides a port to a control processor, a port to a plurality of peripheral storage devices/or host computer, and two ports to buses which connect to other channel interface (CIM) and device interface (DIM) modules permitting data communication to and from a host processor and to and from a multiplicity of peripheral storage devices.

The four ports of the buffer memory system are connected to an address transfer logic system which permits access to each and every one of four memory modules in the system. Additionally a data transfer logic system connects to each one of the memory modules in order to permit the simultaneously Reading out of, and Writing into, of data words, while the four ports provide interface connection to a host system and also to a multiple set of peripheral storage modules.

System cycles are operative so that during any one system cycle, there can be one access allowed from any port to any buffer memory module. However, while this one access is occurring on one system cycle, during the next system cycle there can be another access for either a Readout or a Write-in operation of a data word. The overall effect is that concurrently there is the continuous capability and flow of access to any one of the buffer memory modules from any one of the four ports of the buffer memory system. This insures an equality of access for each and every one of the ports to a desired buffer memory module and also insures that there can be simultaneous action cycles occurring both for the Read-out of data and for the Writing-in of data from any one of the multiple ports.

BRIEF DESCRIPTION OF THE DRAWINGS

FIG. 8 is a drawing showing the relationship between the four ports and the four buffer memory modules during each of a sequence of system cycles;

DESCRIPTION OF PREFERRED EMBODIMENT

Figure 1A:
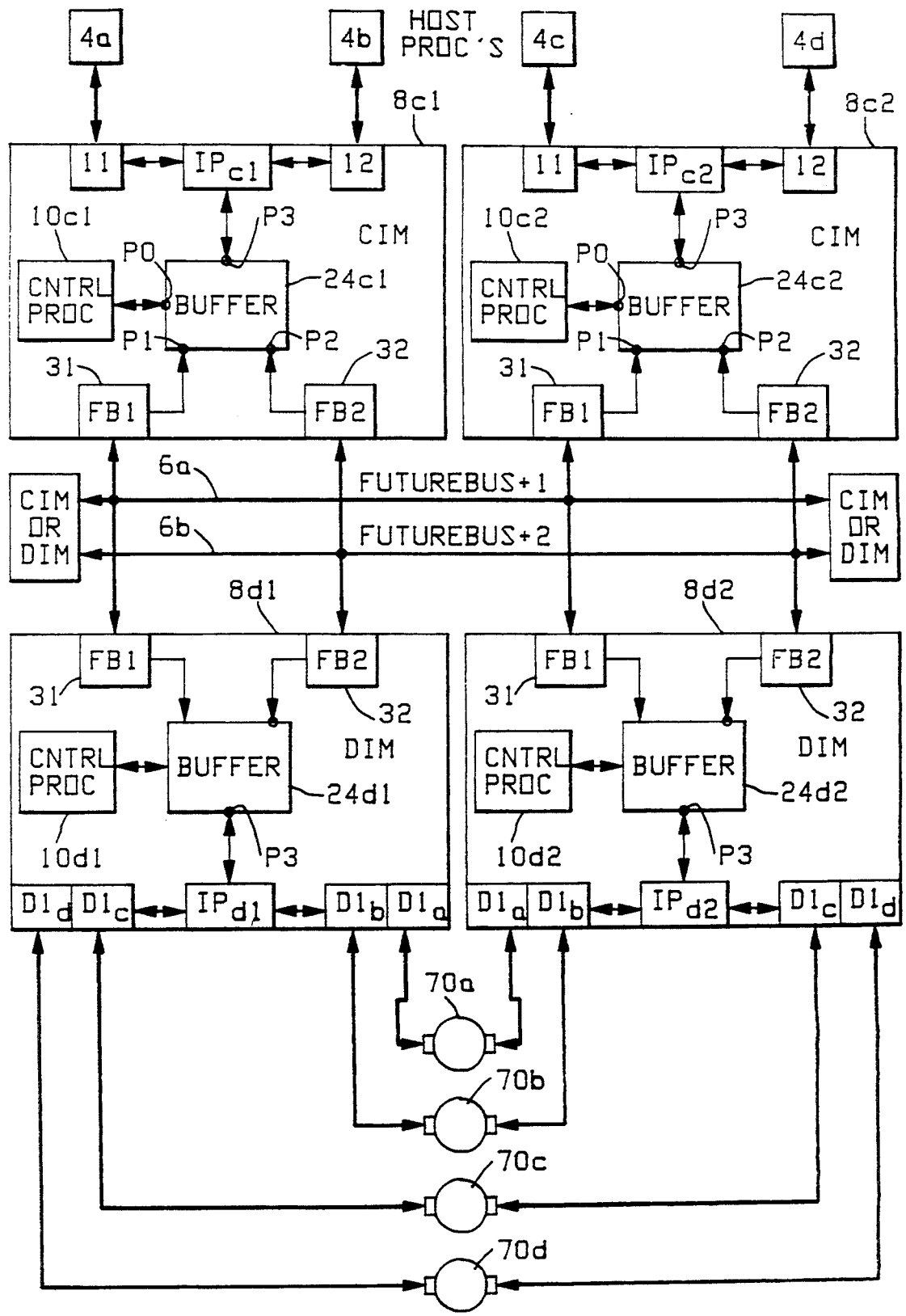
FIG. 1A is a block diagram of a disk mass storage and retrieval system showing one-half of a typical system where there is seen two channel interface modules and two device interface modules which connect the host processors of the system to a plurality of disk drive modules.

Referring to FIG. 1A there are shown four controller boards which are illustrative of one-half of the overall system. The normal system would have eight such controller boards located in a single cabinet.

As seen in FIG. 1A, the two upper controller boards are modules designated as the channel interface module (CIM) and are shown as channel interface module $8_{c1}$ and $8_{c2}$.

The two lower controller boards are designated as device interface modules (DIM) and are indicated as device interface modules $8_{d1}$ and $8_{d2}$.

Referring to the channel interface modules $8_{c1}$ and $8_{c2}$, there will be seen two protocol chips designated I-1 and I-2 which communicate to the main host processor 4 (or alternatively there can be communication to four separate host processors which could be designated $4_a$, $4_b$, $4_c$, and $4_d$). The protocol chips (I-1, I-2) can be designated as block multiplexor channel host interface protocol chips. These function to communicate data and to transfer commands and status information to and from the host processor 4. The first set of protocol chips I-1 and I-2 are under control of the interface processor designated $IP_{c1}$. The interface processor, $IP_{c1}$, controls the protocol chips I-1 and I-2 so that the interface processor ($IP_{c1}$) can independently act in order to provide an appropriate "fair share" of buffer access time to each one of the set of two protocol chips I-1 and I-2.

Likewise, the interface processor $IP_{c2}$ is also a processor which operates as a hardware state machine and also provides the function to insure there will be a fair share of access time between the buffer 24 and each of the protocol chips I-1 and I-2 in its communication to and from the host computer 4.

The interface processor (such as $IP_{c1}$ and $IP_{c2}$) communicates respectively to the buffer memories $24_{c1}$ and $24_{c2}$. These buffer memories are used to store information data, control data, and status data during the operation of the system when data is being transferred between the host computer 4 and a series of peripherals such as disk drive units $70_a$, $70_b$, $70_c$, $70_d$. These disk units $70_a$ through $70_d$ each represent multiple numbers of disk drive units.

Figure 2:
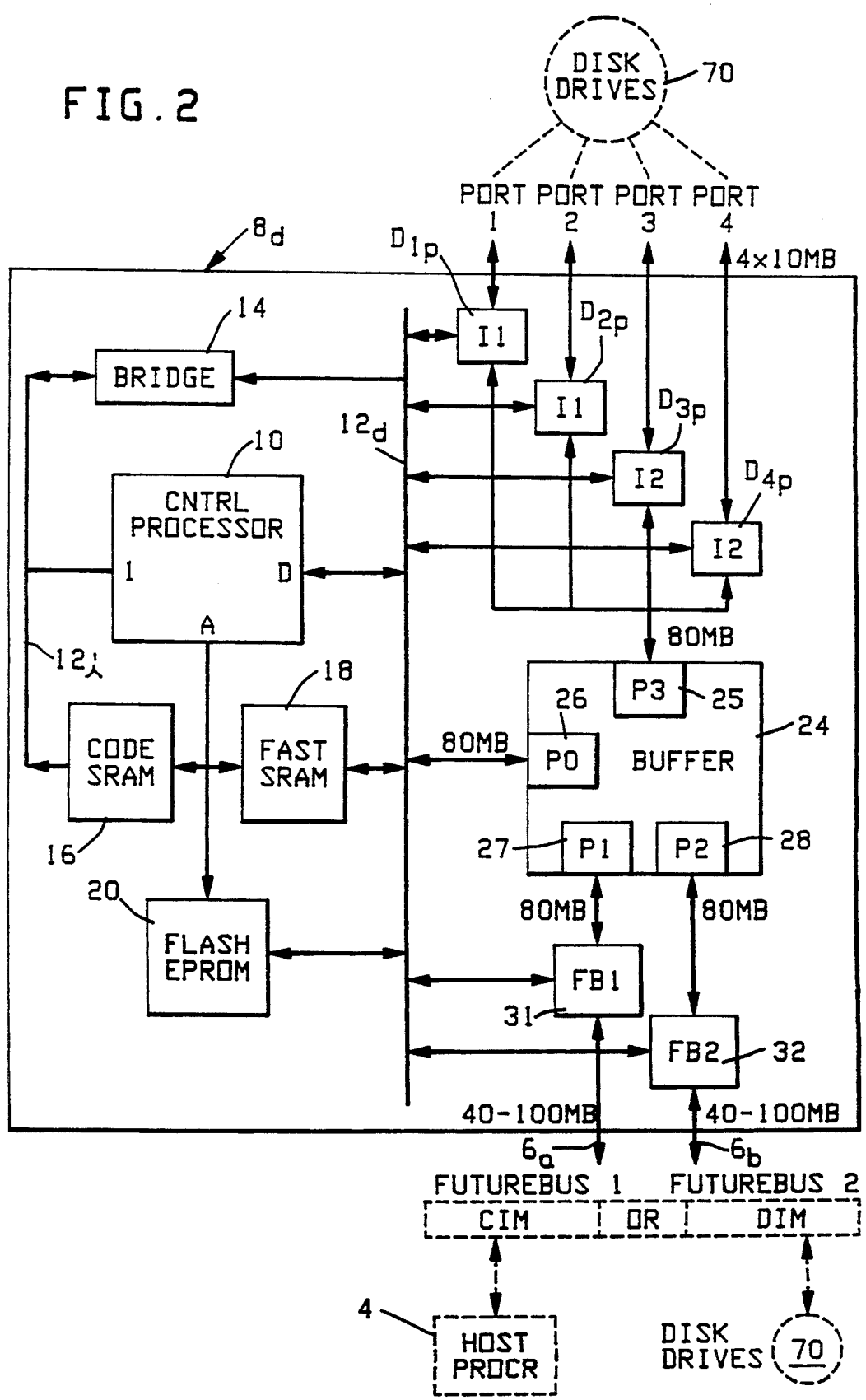
FIG. 2 is a diagram of the device interface module and its internal usage of the multiported buffer memory system.

The buffer memory units $24_{c1}$ and $24_{c2}$ are respectively controlled by the control processors $10_{c1}$ and $10_{c2}$, which also monitor the dual busses $6_a$, $6_b$ through state machines 31, 32 (FB1, FB2, FIGS. 1A, 2) for operability so that a malfunction in one bus will cause the control processor 10, FIG. 2, to channel data through the operable bus.

As indicated in FIG. 1A, the buffer memory (such as $24_{c1}$, $24_{c2}$) will have four ports where the Port P1 connects to the Futurebus state machine (FB1) 31; the Port P2 communicates with the second state machine FB2, 32; the third port P3 of the buffer memory 24 communicates with the interface processor $IP_{c2}$ and the fourth port P0 communicates with the control processor $10_{c2}$.

The Futurebus interface state machines (31,32) designated FB1 and FB2 function to communicate between the channel interface modules ($8_{c1}$, $8_{c2}$) and the device interface modules ($8_{d1}$, $8_{d2}$).

The connective arrangements to the Futurebus interface state machines 31 and 32 are such that two sets of buses designated as $6_1$ and $6_b$ will be seen to interconnect the channel interface modules (CIM) with the device interface modules (DIM) in such a fashion that any channel interface module (CIM) can talk to anyone of the device interface modules (DIM) thru the Futurebus state machines 31 and 32 (FB1 and FB2).

Again referring to FIG. 1A, the lower control boards $8_{d1}$ and $8_{d2}$ are the device interface modules (DIM) which also have buffer memory units $24_{d1}$ and $24_{d2}$ respectively controlled by the control processors $10_{d1}$ and $10_{d2}$.

The buffer memories $24_{d1}$ and $24_{d2}$ will be seen to have connections to the interface processors $IP_{d1}$ and $IP_{d2}$ which are used to communicate with and handle data transfer operations by means of device protocol chips D1 ($D_{1a}$, $D_{1b}$, $D_{1c}$, $D_{d1}$ FIG. 1A). The device protocol chips, D1, are used to communicate to the disk drives $70_1$, $70_b$, $70_c$, and $70_d$ in order to transfer commands, data, and status information between the disk units 70 and the buffers $24_{d1}$ and $24_{d2}$. Likewise also the chips D1 ($D_{1a}$, $D_{1b}$, $D_{1c}$, $D_{1d}$, FIG. 1A) can be arranged to communicate with tape or optical disk storage means.

Operationally, FIG. 1A illustrates how the host processor system 4 can access information and data from the seven disk drives of $70_a$ or the seven disk drives of $70_b$, or $70_c$ or $70_d$.

The host 4 will send a command through the interface protocol chips such as I-1 or I-2. The interface processor ($IP_{c1}$, $IP_{c2}$) will convey this command to the buffer memory (241, 24c2). The control processors $10_{c1}$ or $10_{c2}$ will execute the command and will send the command through the Futurebus state machines 31, 32 (such as FB1 or FB2) to the device interface module (DIM) and its buffer memories (such as $24_{d1}$ and $24_{d2}$) for temporary storage.

The control processor (such as processor $10_{d1}$ or $10_{d2}$) looks at the transmitted command from the host, and selects which one of the FIG. 1A device interfaces, D1 ($D_{1a}$, $D_{1b}$, $D_{1c}$, $D_{1d}$), of the device interface protocol chips will be used for access to send the command to a selected disk drive or other peripheral unit so that information can be accessed from the disk drive and returned through the device protocol interface D1 and into the DIM buffer $24_{d1}$ to $24_{d2}$. The control processor ($10_{d1}$ or $10_{d2}$) will transfer this data from the disk through the Futurebus state machines (31, 32) up to the CIM buffers ($24_{c1}$ or $24_{c2}$). Then the interface processor ($IP_{c1}$, $IP_{c2}$) will transfer this data up to the host system 4, thus completing the first action of data transfer, which may be a READ operation or a WRITE operation.

After this first activity is completed, then the disk drives, such as $70_a$, $70_b$, etc. will provide "status data" back to the host 4 through the same series of channel steps, that is to say, through the device protocol interface, D1, then through the interface processor $IP_{d1}$ then through the buffer $24_{d1}$, then through the Futurebus state machines 31, 32 of the DIM module $8_{d1}$, then by CIM module $8_{c1}$, via the buffer $24_{c1}$ and to the interface processor $IP_{c1}$ and thence through the interface protocol chip (I-1 or I-2) to the host system 4.

Referring to FIG. 2, there is seen a block diagram of the controller board $8_d$ on which is patterned on the device interface module, DIM (indicated as $8_{d1}$ and $8_{d2}$ of FIG. 1A).

The control processor 10, FIG. 2, controls the execution of commands received from the host 4 and operates upon the buffer memory 24. The control processor 10 is supported by the code SRAM 16 which provides microcode for the control processor 10 and is supported by the FAST SRAM 18 which provides a working scratchpad area for the processor 10. The FLASH EPROM 20 is a boot memory for starting up and for the diagnostic operations used by the processor 10.

The control processor 10 has a data bus $12_d$ which connects to the buffer memory 24, to the device protocol interfaces $D1_p$, $D2_p$, $D3_p$, $D4_p$, and also to the Futurebus state machines 31 and 32, to sense any malfunction in busses $6_a$, $6_b$ and to re-direct communication through the properly operating bus. The device protocol interfaces $D_{1a}$, $D_{1b}$, $D_{1c}$, $D_{1d}$ of FIG. 2 correlate to the interfaces D1 of FIG. 1A.

The bridge logic 14 (FIG. 2) is a group of logic gates used to connect the data bus $12_d$ and the instruction bus $12_i$.

The DIM controller board 8 shown in FIG. 2 also indicates that the buffer memory 24 of the DIM 8 has four basic input/output port areas shown as 27, 28, 25 and 26. (These correlate to ports $P_1$, $P_2$, $P_3$, $P_0$ FIG. 1A). The interface ports 27 (P1) and 28 (P2) provide bus connections to the futurebus state machines 31 and 32. The buffer port interface 26 (P0) connects the control processor 10 via the data bus $12_d$, FIG. 2. The buffer port 25 connects the buffer memory 24 to the peripheral units via device protocol chips $D_{1a}$ thru $D_{1d}$, FIG. 1A to provide for channels of communication to the peripheral units $70_p$.

The futurebus state machine 31 (FB1) connects through the Futurebus-1 (designated, $6_a$, to other channel interface modules (CIM). Likewise the Futurebus state machine 32 connects via the bus $6_b$ in order to communicate to other device interface modules or DIMs.

The control processor 10 of FIG. 2 may be implemented with an AMD 29000 RISC processor and is functionally used to control the channel interface module (CIM) and the device interface module (DIM).

The channel interface module $8_c$ (CIM) is architecturally the same as the described DIM $8_d$ of FIG. 2, except that instead of the 4 (quad) ports D1 ($D_{1a}$, $D_{1b}$, $D_{1c}$, $D_{1d}$, FIG. 1A of the DIM), there are dual (2) ports (in the protocol ships $I_1$ and $I_2$) for connection by each CIM bard to the host processors of the host system 4.

Figure 3:
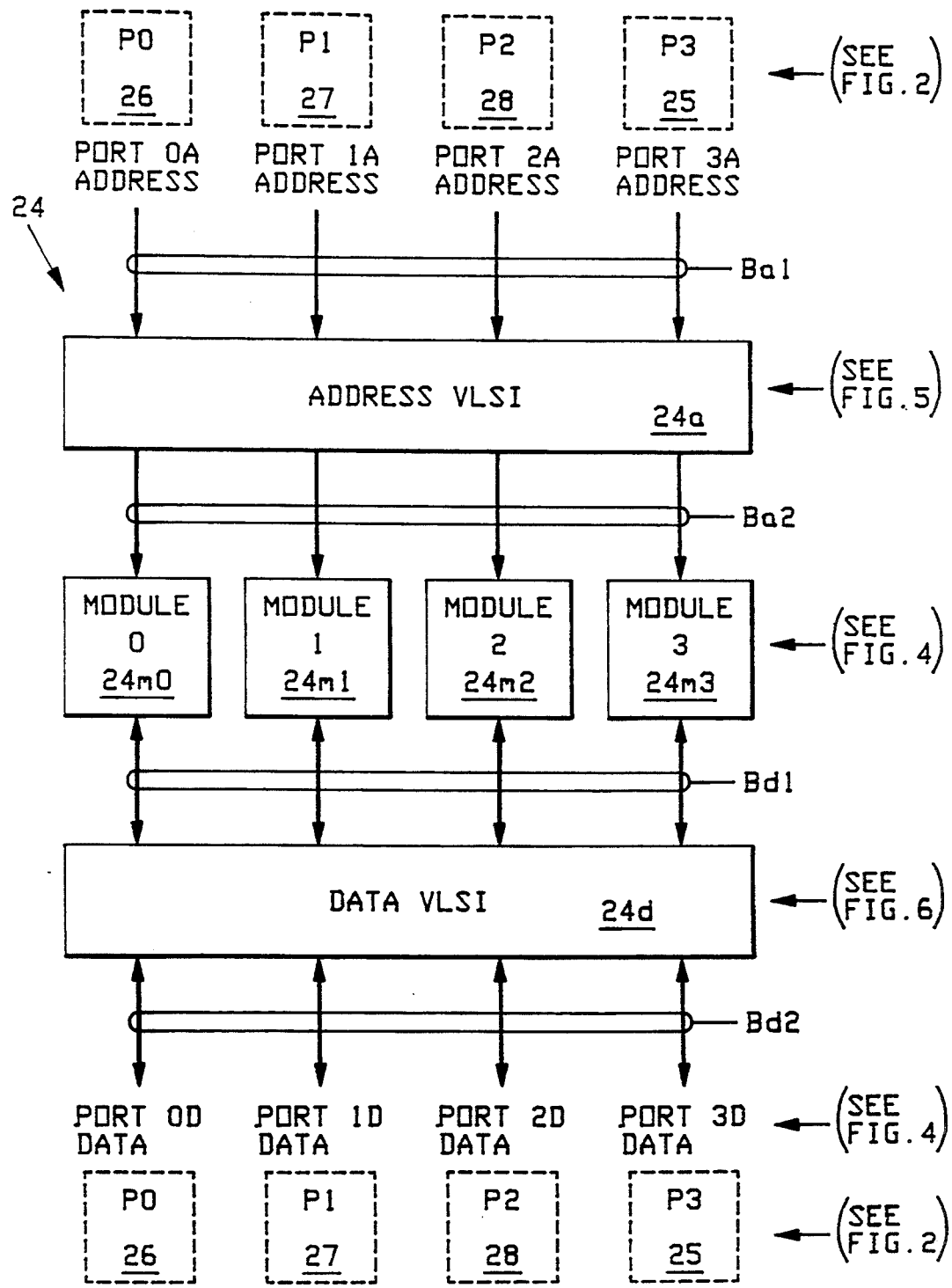
FIG. 3 is a block diagram of the buffer memory system showing the various elements involved.

FIG. 3 is a block diagram showing the elements of the buffer memory 24 previously discussed in FIG. 2.

The buffer memory 24 has a first portion block designated as Address VLSI $24_a$. The Address VLSI block has 4 inputs from 4 address ports designated port 0A, port 1A, port 2A and port 3A which correspond, in FIG. 2, to the elements 26, 27, 28, and 25, and correspond in FIG. 1A to ports $P_0$, $P_1$, $P_2$, and $P_3$.

The Address VLSI module $24_a$ provides addressing connections to the four memory modules $24_{m0}$, $24_{m1}$, $24_{m2}$, and $24_{m3}$. These modules are also designated as memory module 0, 1, 2, and 3, and are static RAMs which are generally designated as SRAM's. Each of these static RAMs will hold 128K×36 bits of memory information.

Then, as noted in FIG. 3, there are a series of output two way data buses $B_{d1}$ connecting each of the four static RAM modules to the Data VLSI module $24_d$. The Data VLSI module $24_d$ is made of two chips which perform the function of multiplexing data to the memory module. A series of data ports 0D, 1D, 2D, and 3D are provided to both take in and put out data to the Data VLSI module $24_d$. In FIG. 2 these four ports are designated as $D_{1a}$, $D_{1b}$, $D_{1c}$ and $D_{1d}$ and they provide for the interchange of data between the peripheral storage units (disk drives 70) and the buffer memory module 24.

The incoming address buses in FIG. 3 are designated $B_{a1}$ and each one of the four buses carries a 27 bit address. The Address VLSI module 24 which receives the data on the buses $B_{ax}$ is a module which is made of one VLSI chip which provides a multiplex function for simultaneously addressing the various memory modules such that any one of the address ports 0A, 1A, 2A, 3A, can operate to address each one of the four memory modules 0, 1, 2, 3. The addressing from the address module $24_a$ is done by means of the address buses $B_{a2}$.

Data which resides (FIG. 3) in the four memory modules 0, 1, 2, and 3 ($24_{m0}$, $24_{m1}$, $24_{m2}$, $24_{m3}$) is connected by a set of data buses $B_{d1}$ to the data module $24_d$. These data buses enable data to be "written" into any one of the four memory modules or to be "Read out" from any one of the four memory modules on a simultaneous or concurrent basis. The data on any one of the data buses of FIG. 3 designated $B_{d2}$, can travel by means of the four data ports 0D, 1D, 2D, 3D, which correlate to $P_0$, $P_1$, $P_2$ and $P_3$ of FIG. 2.

The data buses $B_{d2}$ each carry 36 bits of data to or from the memory modules 0, 1, 2, 3, for purposes of reading 36 bits of data or for writing in 36 bits of data.

The four address ports 0A, 1A, 2A, 3A (also designated as 26, 27, 28, and 25) receive the addresses from the control processor 10 such that any one or each one of the ports 0A, 1A, 2A, 3A, can address any one of the four memory modules 0, 1, 2, 3 ($24_{m0}$, $24_{m1}$, $24_{m2}$, $24_{m3}$) concurrently in time.

In conjunction with the addressing of the various memory modules, it is also possible, at the same time, for data to be entering the ports 0D, 1D, 2D, and 3D ($P_0 P_1$, $P_2$, $P_3$) for purposes of writing into the particular sections of the addressed modules 0, 1, 2, and 3, of FIG. 3.

Likewise, concurrently data can also be being read out of the modules memory 0, 1, 2, and 3 and sent via the Data VLSI module $24_d$ over to the data output ports 0D, 1D, 2D, 3D also designed $P_0$, $P_1$, $P_2$ and $P_3$ on FIGS. 2 and 3.

It should be understood, for example, that while port 2A is providing an address to the Address VLSI 24., then at the same time, data can be entering for writing purposes on port 2D. For example, port $P_2$(28), it should be understood, has two aspects, i.e. 27 address lines (2A) and 36 data lines (2D).

It is possible for any one of the four ports 0A, 1A, 2A, 3A to address any one of the four memory modules 0, 1, 2, 3 concurrently and simultaneously while at the same time data is being written into or read from any particular ones of the memory modules 0, 1, 2, 3 by means of data transfers through the Data VLSI 24d. For example, each of the four ports 0D, 1D, 2D, and 3D can be writing to the same module, for example, as module 2, concurrently in order to write in data at separate or same locations in module 2 ($24_{m2}$).

This is permissible since there can be four simultaneous addresses appearing on ports 0A, 1A, 2A, 3A, in order to tag or locate the special location in module 2 where the writing of data is to be done.

Another example of the buffer memory system flexibility is that, for example, there may be two Reads and two Writes occurring at the same time involving each of the four memory modules 0, 1, 2, and 3, the only limitation being that each port 0A, (address) and port 0D data information occur simultaneously. Similarly, the addressing through the port 2A to the memory module 2 ($24_{m2}$) must be simultaneous with the data port 2D (28), holding the 36 bit data word.

It should be understood that each combination of "address" and "data" port is an independent operable entity. Thus, operationally, any port can access and address any location in any one of the four memory modules.

Likewise, any one of the data ports (0D, 1D, 2D, 3D) can access locations in any one of the four memory modules. The only limitation is that there be a "concurrence" in time between the port address information delivery and the presence of the data via its corresponding data port.

Figure 4:
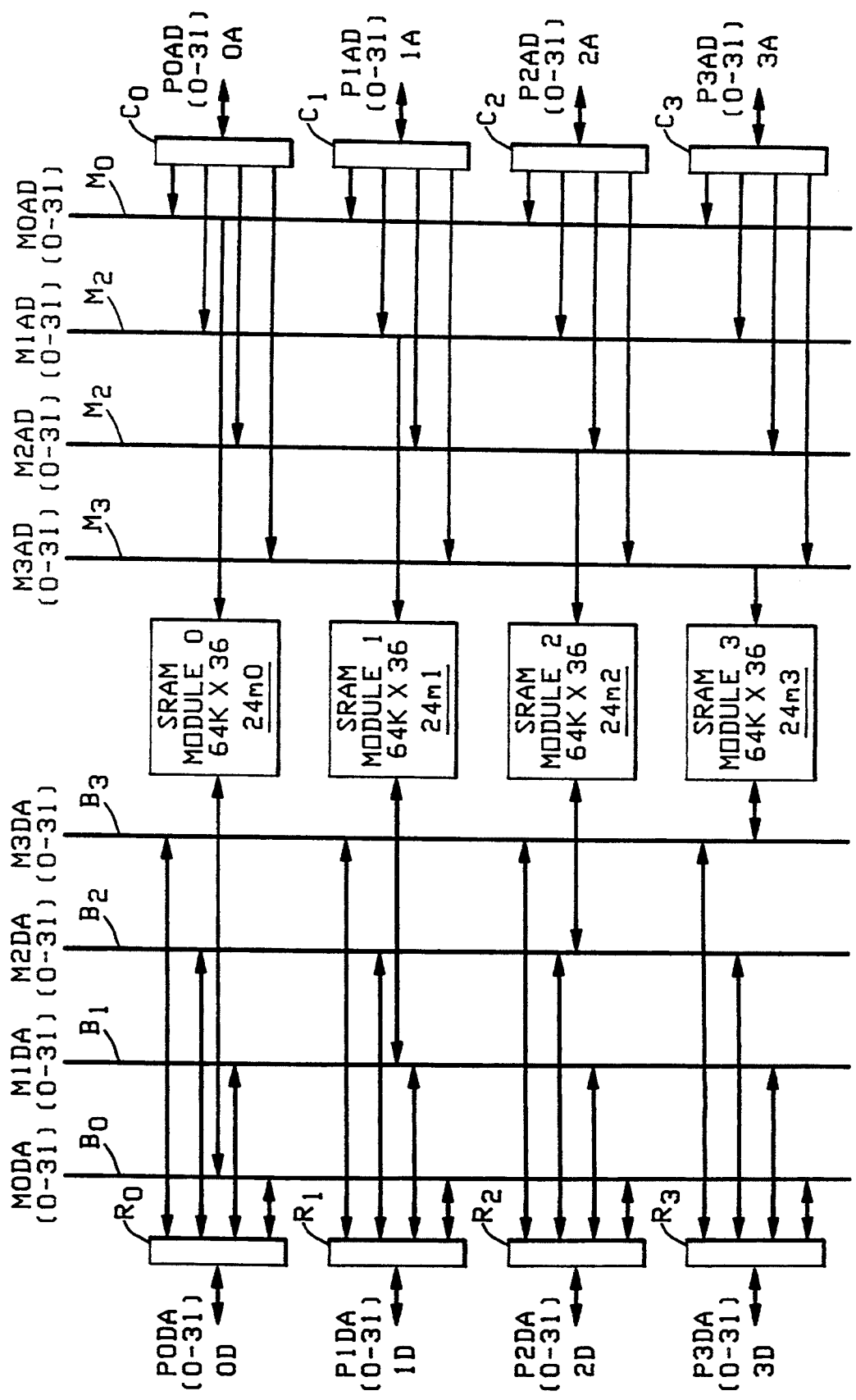
FIG. 4 is a interconnecting diagram showing how the buffer memory modules are interconnected to the four ports involved in the buffer memory system.

Referring to FIG. 4, there is seen the four static RAM buffer modules 0, 1, 2, 3, ($24_{m0}$, $24_{m1}$, $24_{m2}$, $24_{m3}$).

Each of the buffer RAM memory modules 0, 1, 2, 3 are addressed via the counters $C_1$, $C_1$, $C_2$, and $C_3$ on the right hand side of FIG. 4. These counters receive address information via one of the port connections to control processor 10($P_0$), interface processor port 25 (P3), Futurebus interfaces 31 (FB1) via $P_1$ or 32 (FB2) via $P_2$. This information is placed in a counter and the incoming address is distributed to each one of four buses which are the memory address buses designated $M_0$, $M_1$, $M_2$, $M_3$. This arrangement permits the address from any given port such as port 0A, 1A, 2A, 3A, to be placed in each of the respective counters $C_0$, $C_1$, $C_2$, and $C_3$. Then each of these counters will provide the incoming address to each one of the buses $M_0$, $M_1$, $M_2$, and $M_3$.

In this fashion, every incoming address on every one of the ports may be conveyed to every single one of the individual memory modules 0, 1, 2, 3, ($24_{m0}$, $24_{m1}$, $24_{m2}$, $24_{m3}$).

Likewise looking to the left-hand side of FIG. 4, it will be seen that the series of ports designated port 0D, 1D, 2D, 3D, each provide communication lines for the entry or the exit of data information. These consist of 36 bit data words. Each of the data input ports can convey an input data word into a register involved with the particular port. The register for each port is designated as $R_0$, $R_1$, $R_2$, and $R_3$. Each of the registers are arranged so that the data word may be conveyed to each and every one of the four buses designated $B_0$, $B_1$, $B_2$, and $B_3$, so that when data is being written into a memory module, it is possible for any one of the ports to access any one of the addressed memory modules in order to write in a 36 bit data word.

Likewise, the busses $B_0$ thru $B_3$ also operate for "Reading" operations so that any data word accessed from any one of the memory modules 0, 1, 2, 3, can then be transferred to any one of the four ports 0D, 1D, 2D, 3D, for export to the control processor 10, to disk drives 70, to Futurebusses 31, 32.

Thus it is possible, for example, such that memory module 1 ($24_{m1}$) can be addressed through the address port 0A, and at the same time the data port 0D can be writing in data into that addressed location in module 1 ($24_{m1}$).

Similarly and concurrently, address port 1A can be addressing a location in memory module 1 ($24_{m1}$) at the same time that the data port 1D is enabling the read out of a data word from module 1 ($24_{m1}$) over to a requesting master such as control processor 10.

In FIG. 4, it will be noted that each memory module $24_{m0}$, $24_{m1}$, $24_{m2}$, $24_{m3}$ is connected to each one of the four address ports 0A, 1A, 2A, 3A, and likewise each memory module is connected to each one of the data ports 0D, 1D, 2D, and 3D.

Thus there can be concurrent or simultaneous operation of at least four action cycles taking place in the buffer memory 24. These four action cycles can be any mixture of Reads and Writes such as two Reads and two Writes or three Writes and one Read all occurring simultaneously.

It should be noted that the registers $R_0$, $R_1$, $R_2$, $R_3$, FIG. 4, are arranged such that each register will hold data which is either to be written in, or which is to be read out, and thus this data will be available to any one or each one of the four buses $B_0$, $B_1$, $B_2$, $B_3$, so that this data can then be used by any one of the four data ports 0D, 1D, 2D, 3D.

Figure 5:
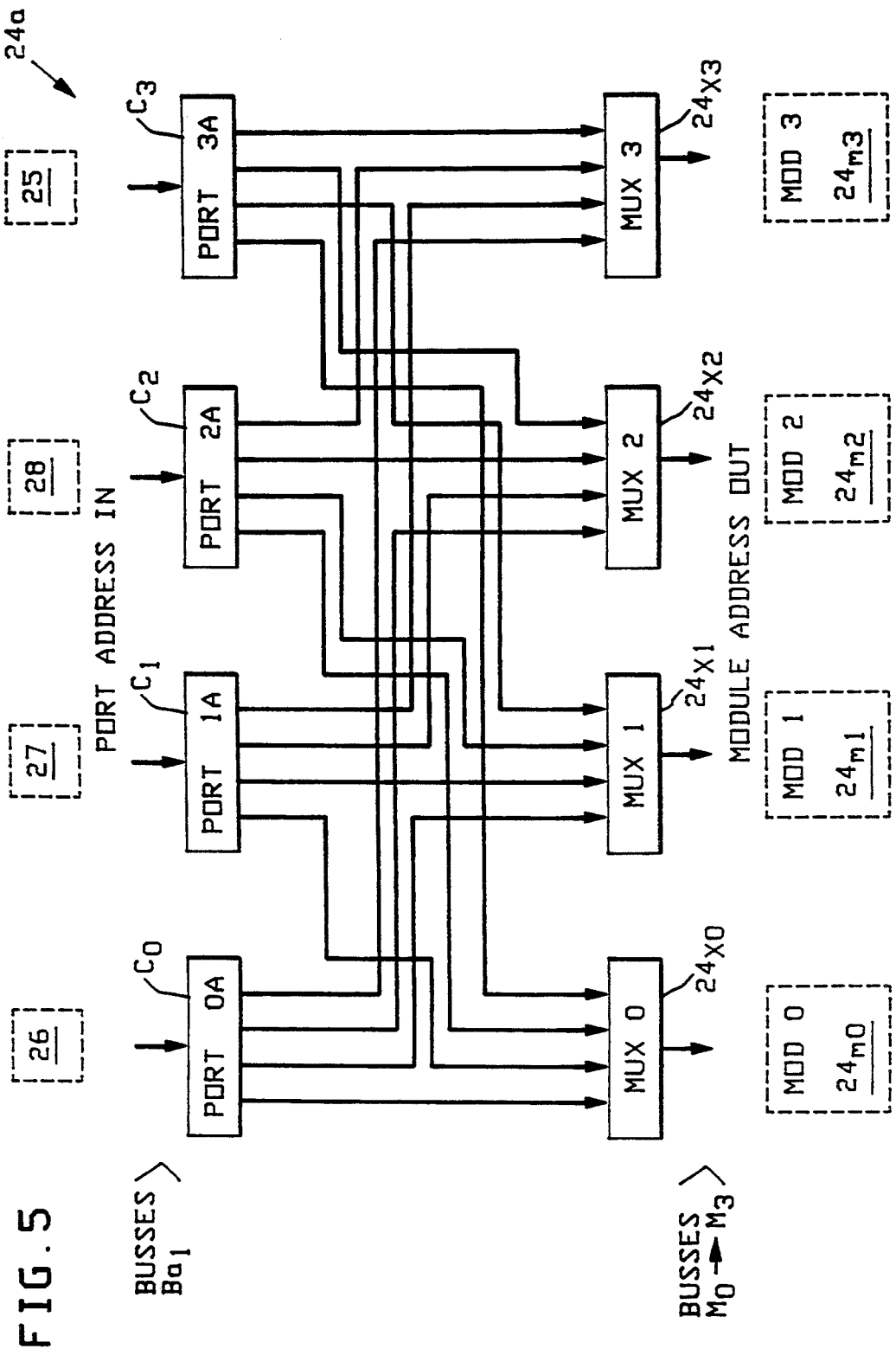
FIG. 5 is a more detailed diagram of the address transfer system of the buffer memory using buses and VLSI circuitry.

Referring to FIG. 5 there is seen more detailed drawing of the Address VLSI block module $24_a$, previously shown in FIG. 3.

As was indicated in FIG. 2, there were four ports in the buffer 24 which were designated as 25, 26, 27, and 28 (P3, $P_0$, $P_1$, $P_2$) and these ports are shown as indicated at the top of FIG. 5 showing the port address in. Each of the input buses ($B_a$, $B_{a0}$, $B_{a1}$, $B_{a2}$, $B_{a3}$) here are attached to a counter ($C_0$, $C_1$, $C_2$, and $C_3$). Each of these counters have four connections which are fanned out to include each of four multiplexors, MUX 0, 1, 2, 3, designated $24_{x0}$, $24_{x1}$, $24_{x2}$, and $24_{x3}$. Each of these multiplexors will hold the memory module address received, for a period of one system cycle. Then the output of each of the multiplexors 0, 1, 2, 3, are passed on respectively to each of the SRAM memory modules 0, 1, 2, 3, ($24_{m0}$, $24_{m1}$, $24_{m2}$, and $24_{m3}$).

Each address coming on each of the ports 0A, 1A, 2A, and 3A will be conveyed by the four buses in each port (0A, 1A, 2A, 3A) over to the module ports designated as MUX 0, 1, 2, and 3 ($24_{x0}$–$24_{x3}$).

As the counters are incremented, that is to say, $C_0$, $C_1$, $C_2$, and $C_3$, then each particular MUX module interface ($24_{x0}$, $24_{x1}$, $24_{x2}$, $24_{x3}$) will have a period of time called a "system cycle" in which a particular address is available in that particular module interface.

Thus, at the first "system cycle", the module interface MUX0 will hold the incoming address from port 0A. On the next (second) system cycle, the MUX0 will hold the address input to port 1A; on the third system cycle, the MUX0 will hold the address from the port 2A; and on the fourth system cycle, the MUX0 will hold the address which was inserted at port 3A.

Likewise this sequence of available addresses occurs in the other module interfaces MUX0, MUX1, MUX2, and MUX3.

The Address block module 24, in FIG. 5, will be seen to have a bus output M0-M3 from each of the module interfaces (MUX0, 1, 2, 3,) over to the four SRAM memory modules 0, 1, 2, 3. The connections are provided by the address buses $M_0$, $M_1$, $M_2$, and $M_3$ of FIG. 4.

Thus it will be seen that there is a sequence of communications whereby port 0A talks first to module interface MUX0 for one system cycle; then port 0A talks to MUX1 for the next system cycle; and port 0A talks to MUX2 for the next system cycle, and then 0A talks to MUX3 for the next system cycle.

While this is occurring, each of the other ports are subsequently talking to the next module interface in sequence. This will be subsequently shown in FIG's. 8A, 8B, 8C, and 8D.

Figure 6:
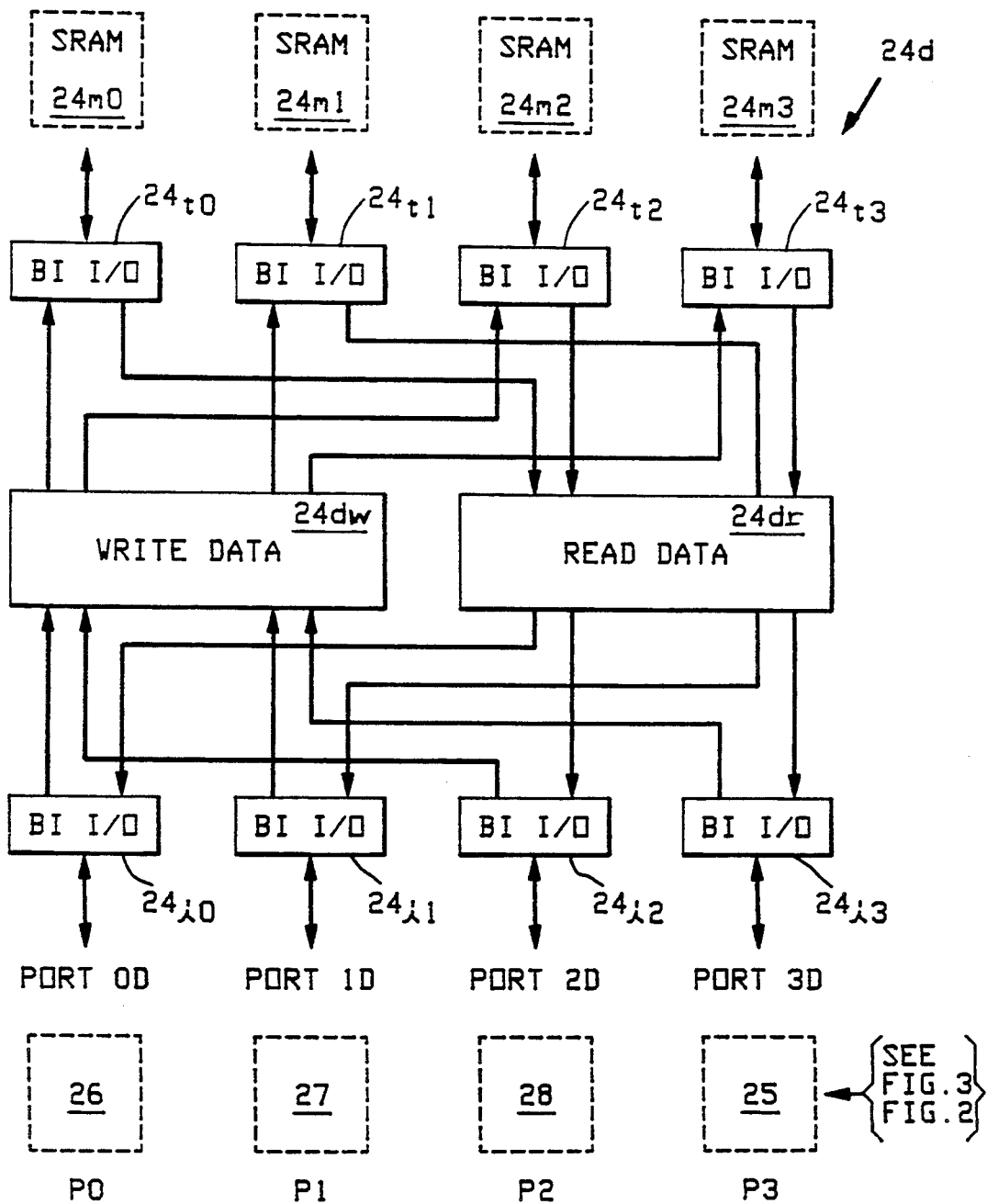
FIG. 6 is a more detailed block diagram showing the elements of the data transfer logic of the buffer memory system.

The Data VLSI block module 24d of FIG. 3 is now shown in more detail in FIG. 6.

Referring to FIG. 6, the Data block module $24_d$ provides for one lower group of four bidirectional transceivers designated $24_{i0}$, $24_{i1}$, $24_{i2}$, $24_{i3}$.

These bidirectional transceivers connect respectively to the ports shown in FIGS. 2 and 3 as 26, 27, 28, and 25 respectively, also designated $P_0$, $P_1$, $P_2$, $P_3$.

This means that the buffer memory 24 has ports reaching to the control processor 10, host processor 4, the Future bus state machine 31 and the Future bus state machine 32 for connection respectively to other channel interface modules (CIM) and other device interface modules (DIM) as indicated in FIG. 2.

Referring again to FIG. 6 to the upper transceiver group, it will be noted that each of the bidirectional transceivers $24_{t0}$, $24_{t1}$, $24_{t2}$, and $24_{t3}$, each have two buses allocated to them so that each of the bidirectional transceivers have a READ bus and a WRITE bus respectively to the READ data logic unit $24_{dr}$ and to the WRITE data logic unit $24_{dw}$. The logic units $24_{dr}$ (data read) and $24_{dw}$ (data write) are each provided for by a single chip unit which uses logic gates.

Each of these upper group transceivers $24_{t0}$, $24_{t1}$, $24_{t2}$, $24_{t3}$ connect one of the static RAM modules $24_{m0}$, $24_{m1}$, $24_{m2}$, $24_{m3}$, (Modules 0, 1, 2, 3) to a particular one of the bidirectional transceivers, $24_{t0}$–$24_{t3}$.

Each of the bidirectional transceivers $24_t$ and $24_i$ will be seen to have a READ bus connected to the READ data logic unit $24_{dr}$ and also will have a WRITE bus connected to the WRITE data logic unit $24_{dw}$.

Thus it will be seen that it is possible for any one of the four ports 25, 26, 27, 28 (of buffer 24 of FIG. 2) to be connected for either READ operations or for WRITE operations to and from any one of the memory modules $24_{m0}$ $24_{m1}$, $24_{m2}$, and $24_{m3}$.

Figure 7:
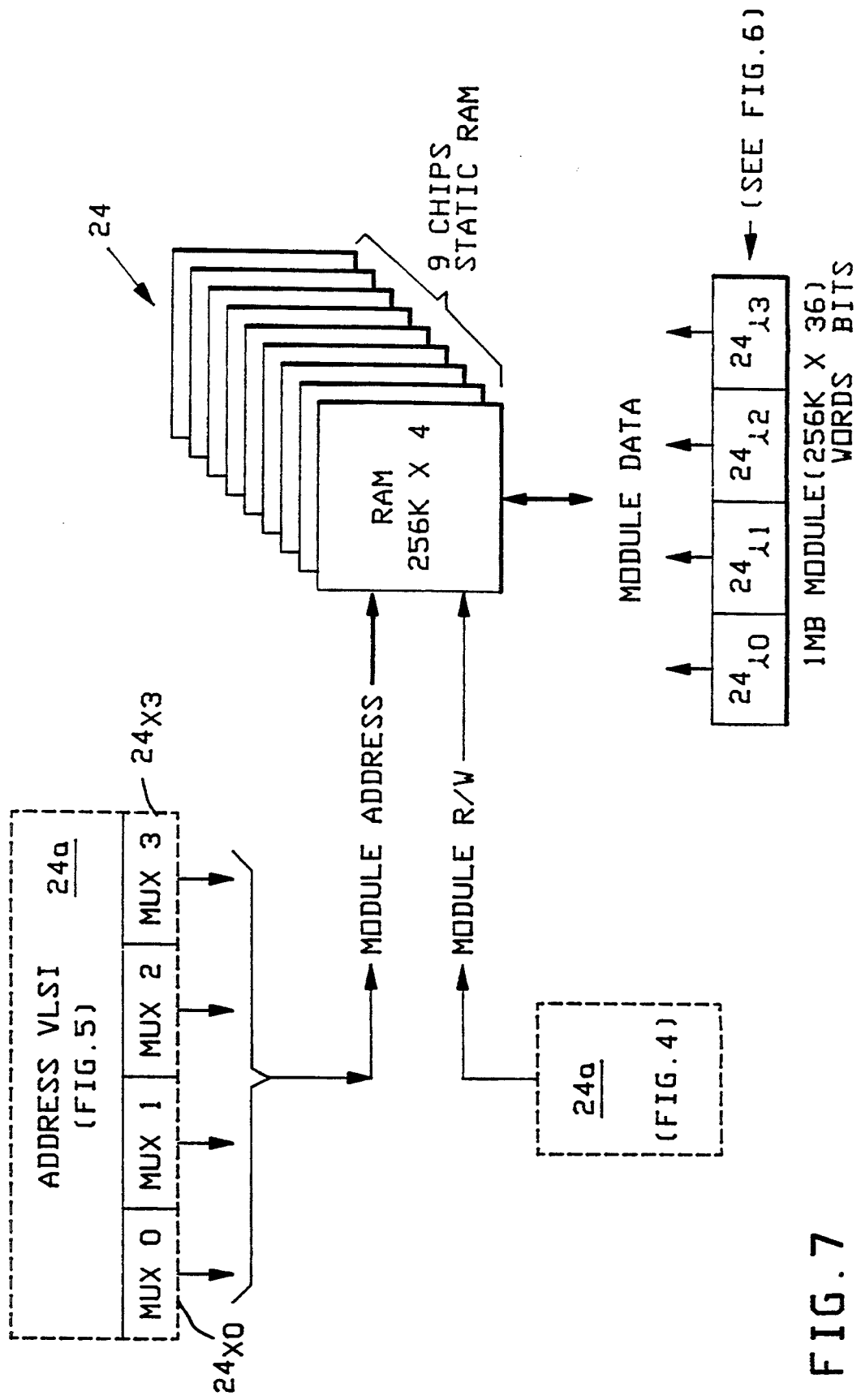
FIG. 7 is a schematic drawing showing the arrangement of RAM chips to form the four-module buffer memory system.

Referring to FIG. 7, there is seen a schematic drawing of nine chips of static RAMs which are used to form the memory buffers 24 of FIG. 2 and also the Modules 0, 1, 2, 3, designated $24_{m0}$ $24_{m1}$, $24_{m2}$, and $24_{m3}$, of FIG. 3.

Each chip of the nine chips is a RAMchip of 256K ×4 bytes for a total of four megabytes for the total memory buffer 24.

The module address inputs shown in FIG. 7 are sourced from the MUX module interfaces 0, 1, 2, 3, ($24_{x0}$–$24_{x3}$) shown in FIG. 5.

The module READ/WRITE control lines are sourced from the Address VLSI control unit $24_a$ of FIG. 5.

The two way buses from the buffer memory RAM chips, which carry the data words show that the transceivers $24_{t0}$, $24_{i1}$, $24_{t2}$, and $24_{t3}$, of FIG. 6 are the connecting vehicles for the Data block module $24_d$ (FIG. 3) to the buffer memory modules 0, 1, 2, 3.

The designation 256K×4 on each chip represents the storage of 4 groups of 256 thousand bits of data in each chip. Thus with 9 chips, there are 9×4=36 bit words available on the 9 chips for a total of 1 megabyte of data where each byte represents 8 bits.

The 256K×36 represents that there are 256 thousand words of 36 bits each. This represents a module of one megabyte.

The buffer memory of the presently described disk drive control system provides for a buffer access time of 50 nanoseconds from any one of the four ports 25, 26, 27, and 28.

Additionally, the system provides for a data rate of 320 megabytes per second for data transfer.

It will be noted that data availability is possible for any of the ports at any particular time. Additionally there is provided a "wait period" for each port so that there will be "fairness" of access of data between the ports so that one port will not monopolize all the access time but that the access time will be distributed among the four ports.

Thus the multiport buffer 24 (of FIGS. 1, 2, 3, and 4) permits the simultaneous transfer from buffer memory to each of the ports and from each of the ports to the buffer memory in any buffer memory location including the very same location on a different system cycle.

The "system cycle" described herein is based on a 20 megahertz clock time which provides for a 50 nanosecond system cycle.

The "command cycle" involves the initiation of an instruction by host computer 4 until the completion of the cycle is signalled by the receipt (by host 4) of a "status signal" indicating completion or non-completion.

Major significant features of the buffer memory system in each of the interface controller boards (CIM, DIM) may be listed as follows:

(1.) All of the memory chips used in the buffer memory system are single ported static RAMs which are generally less expensive, more dense in holding information, and spatially smaller than multiport static RAMs.

(2.) The buffer memory system has 4 ports where each port has a data width of 36 bits, which constitutes a data word.

(3.) Each one of the 4 ports has the ability to access any location in any one of the memory modules of the buffer memory system.

(4.) The maximum "wait" for any first access of the buffer memory to occur is 350 nanoseconds. Subsequently, access to the concatenated following words will be at a rate of 80 megabytes per second for the entire data burst length.

(5.) The "burst length" can be from 1 word alone to a maximum of the entire size of the allowable buffer memory which is 64 megabytes.

(6.) The address unit $24a$ has its address input bus at a width of 24 bits which can address a maximum of $2^{24} = 16,777,216$ words (4 bytes each) for a total of $16,677,216 \times 4 = 67,108,864$ bytes (64 Mega bytes).

The operation of the buffer 24 is illustrated in FIG. 8 which is subdivided into sections as FIG. 8A, FIG. 8B, FIG. 8C, and FIG. 8D.

The left-hand column in each case shows the ports which are designated as Port 0, Port 1, Port 2, and Port 3. These correspond to the ports shown in FIG. 3 which show the address ports 0A, 1A, 2A, and 3A, and in FIG. 2 as ports 26, 27, 28 and 25 respectively.

The top row of FIG. 8 shows the various buffer memory modules $24_{m0}$, $24_{m1}$, $24_{m2}$, and $24_{m3}$ which have been designated in FIG. 8 as Module 0, Module 1, Module 2, and Module 3.

The "shaded portion" in each case shows how each port is connected to a particular module and also shows the particular function that is occurring.

Referring to FIG. 8A, it will be seen that Port 0 (0A, 0D, 26) (FIG. 3) is connected to Module 0 for the purpose of "accessing" a buffer memory location.

At the same time, it will be seen that Port 1 (1A, 1D, 24) (FIG. 3) is connected to Module 1 for the purpose of accessing a location in buffer memory 24.

Likewise in FIG. 8A, the Port 2 (2A, 2D, 28) (FIG. 3) is seen connected to Module 2 for the purpose of accessing a buffer memory location.

In FIG. 8A, the Port 3 (3A, 3D, 25) (FIG. 3) is connected to Module 3 for the purpose of accessing a memory location.

Concurrently and simultaneously all the functions of FIG. 8A happen in one system cycle. In the next system cycle after FIG. 8A, the buffer is in position of FIG. 8B and similarly the buffer operations in the following system cycles are shown in FIGS. 8C and 8D.

In FIG. 8B, (second system cycle), it is seen that Port 0 (FIG. 3) is connected to Module 1 for accessing a data location; then Port 1 is accessing Module 2 for a data location function. Similarly Port 2 is accessing Module 3 as a data location function, and likewise Port 3 is accessing Module 0 as a data location function.

It may be noted that in FIG. 8A, while Port 0 is accessing Module 0, then at the same time Port 1 is performing a WRITE operation on Module 0, and an increment operation on Module 3, and Port 2 is performing an increment operation (address counter increment) on Module 0 while also doing a Write operation to Module 1, and similarly in FIG. 8A, Port 3 is simultaneously performing a READ operation from Module 0.

Likewise as can be seen from FIGS. 8B, 8C, and 8D, various ones of the Ports 0, 1, 2, 3, are connecting to the various memory Modules 0, 1, 2, and 3 for purposes of performing access operations, READ operations, and WRITE operations, and increment (address counter increment) operations during the very same system cycle.

Figure 9:
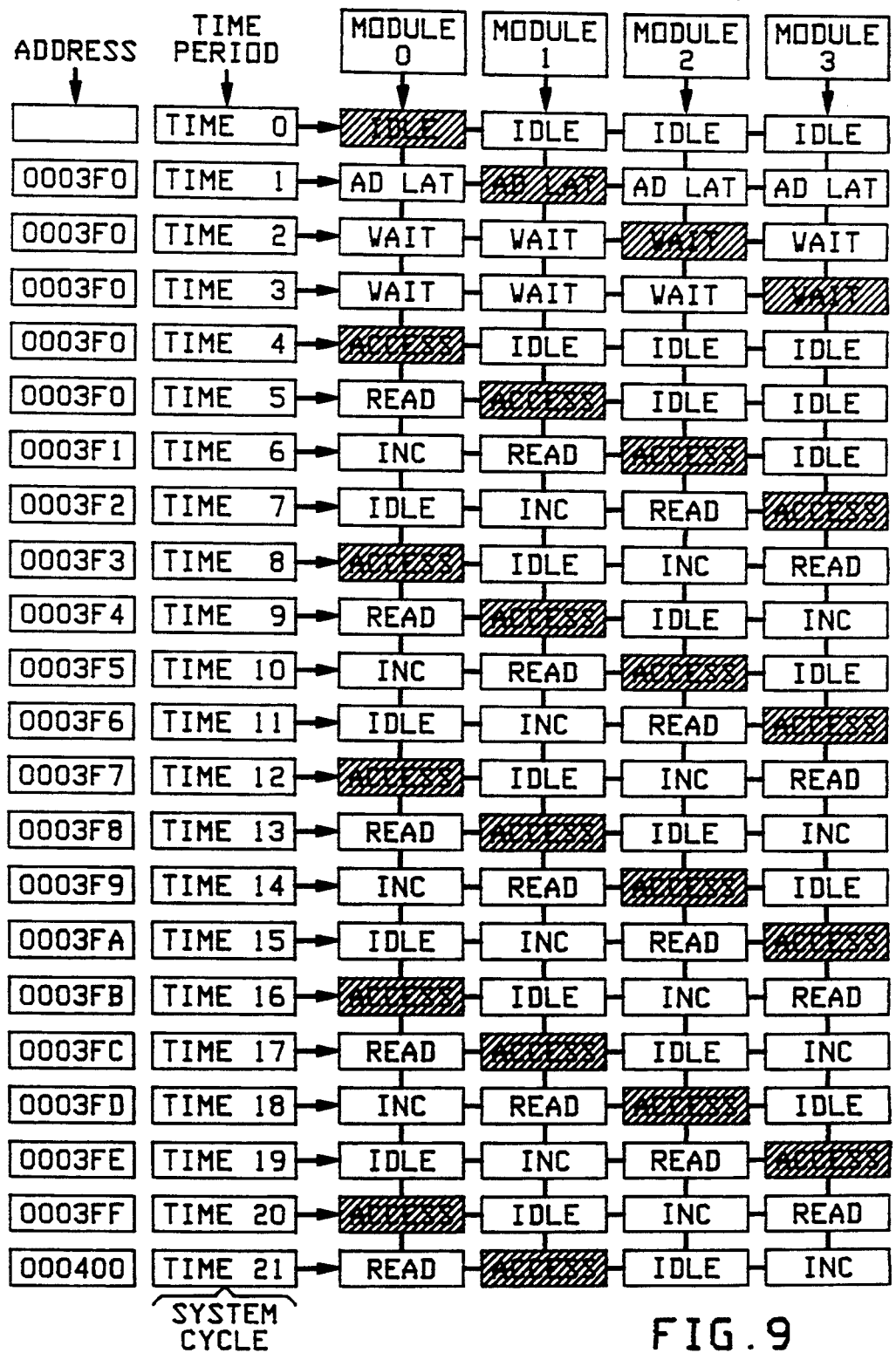
FIG. 9 is a drawing showing the time sequence wherein various addresses interact with the four memory modules of the buffer memory system in performing access-Read operations.

Referring to FIG. 9, there is shown a typical example for the Access-READ function, for example, as accomplished by the Port 0 of FIG. 8. At the left-most column of FIG. 9 there is shown a series of addresses to be used to access locations in various modules of the buffer memory 24.

The second column at the left shows various time periods (system cycles) from time 0 thru time 21. This indicates the function that is occurring at any given time period in this example, wherein it is considered that Port 0 (FIG. 8) is involved with various functions in the different sections of Module 0, Module 1, Module 2, and Module 3.

Thus at Time 0 thru Time 5, it is seen that there is a "Wait", starting from Time 2, in which the address remains the same; and it is during this period of Time 0–5 that the Port 0 has an "Idle" function with the Module 0; has an "address latching" function with module 1 (Time 1); has a "Wait" function with Module 2 (Time 2) and has a "Wait" function with Module 3 (Time 3).

In FIG. 9 it will noted that, at Time 5, the Port 0 (of FIG. 8) performs a READ function from Module 0, and then at Time 6, Port 0 performs a READ function with Module 1; at Time 7, the Port 0 performs a READ function with Module 2; and at Time 8, the Port 0 performs a READ function with Module 3 and so on down through the various time periods.

Each of the time periods shown at the left hand column of FIG. 9 represents a "system cycle" so that the time between the Time 0 and Time 1 is one system cycle, or for example, the time between Time 10 and 11 is a system cycle.

Figure 10:
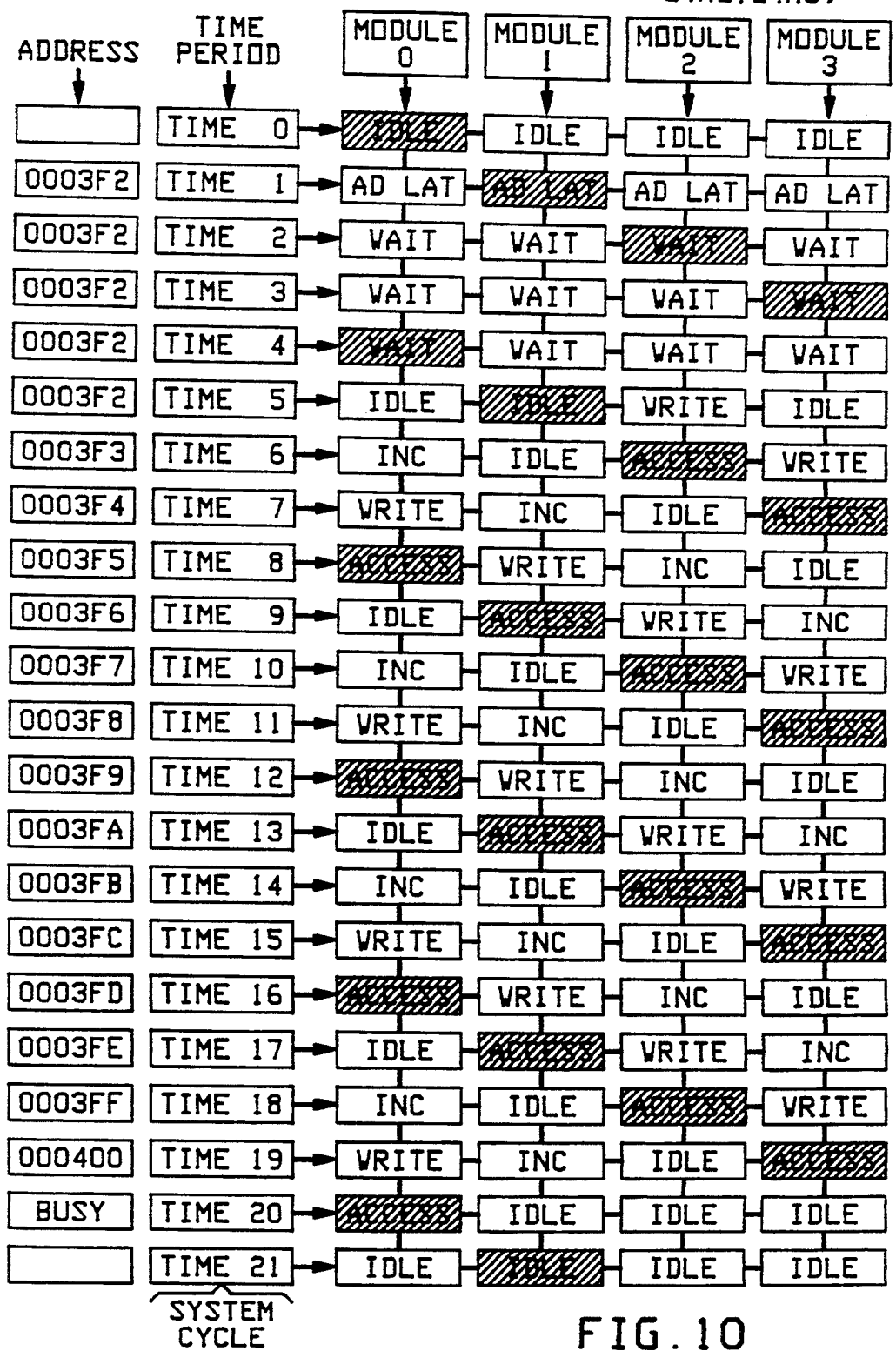
FIG. 10 shows the access Write function during a period of system cycles showing the relationship between the address, the time period involved and the various functions in each of the four memory modules.

Another example is provided in FIG. 10 (Access-Write) in order to show, for example, how Port 0 (of FIG. 8) can concurrently and simultaneously perform access and WRITE functions with various ones of the buffer memory Modules 0, 1, 2, 3 ($24_{m0}$, $24_{m1}$, $24_{m2}$, $24_{m3}$).

At the left hand column of FIG. 10, there is the starting address at Time 1 shown as 0003F2. Then there is a "waiting" period up until Time 5 where the address remains the same. After this period, the address changes (increments) at each succeeding time until at Time 19, the address is 000400.

Thus, using this example again of showing how the Port 0 connects to various ones of the buffer memory modules, it will be seen that various Idle and Wait and Address Latch functions occur from Time 0 thru Time 4, but that at time period 5, the Port 0 now performs a WRITE function into Module 2, and at Time 6, the Port 0 performs a WRITE function into Module 3.

Likewise at Time 7, the Port 0 performs a WRITE function into Module 0, and at Time 8, the Port 0 performs a WRITE function into module 1, etc.

Thus the functionality of the buffer memory 24 is such, as shown in FIGS. 9 and 10, that there is concurrently and simultaneously, both "Reading" of data from various modules of the buffer memory by each of the ports and there is also the "Writing" into various modules of the buffer memory by various ones of the ports.

FUNCTIONAL OPERATIONS

Figure 1B:
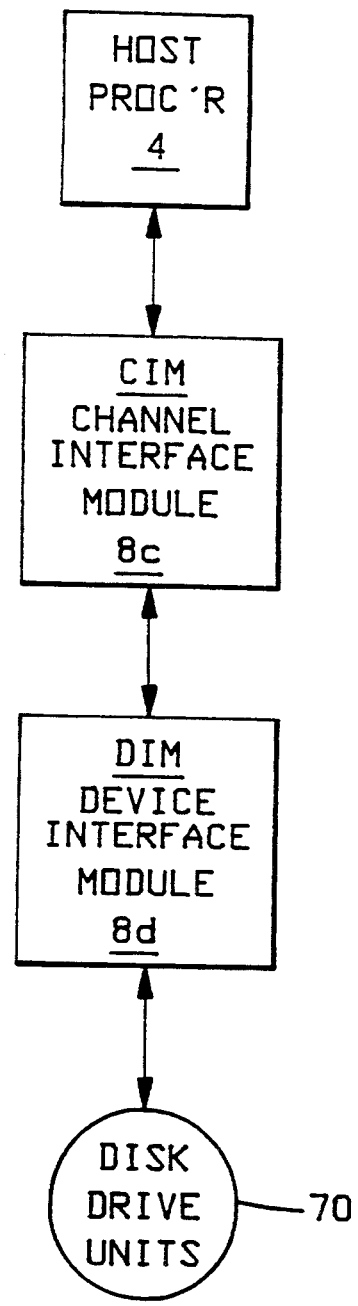
FIG. 1B is a simplified block diagram of the overall mass storage system.

The peripheral storage devices (disk drives) and mass storage system of FIG. 1 (which represents one-half of the overall system) provides the functions of Reading data from peripheral storage and Writing data into peripheral storage. Additionally, each of these actions initiates a STATUS operation to inform the main host computer 4 of the completion or incompletion of each Read/Write command.

Figure 11:
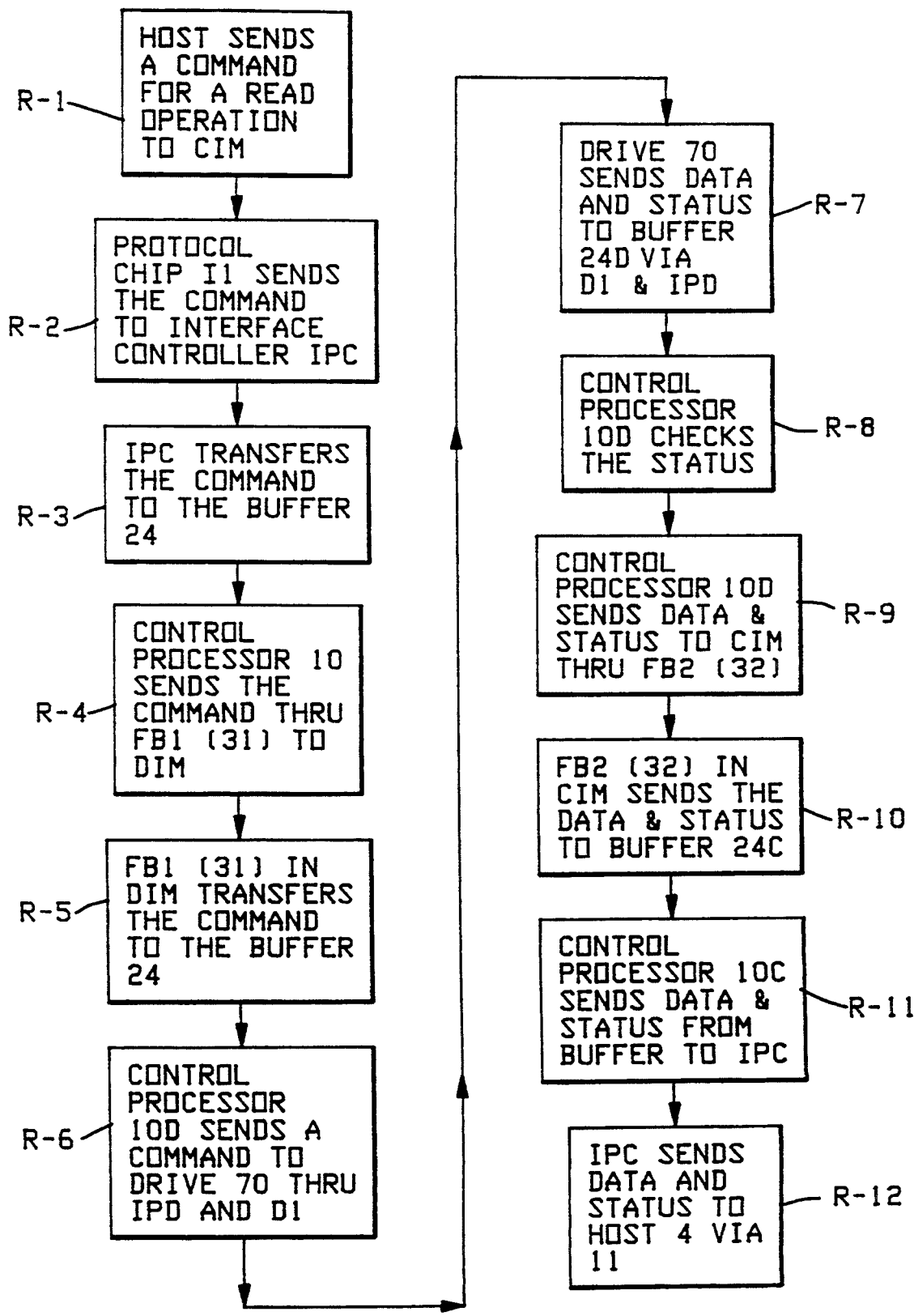
FIG. 11 is a flow chart showing the function of the overall system during a Read and Status operation.

As seen in FIG. 11, the steps R-1 through R-12 are involved for the Read and Status Operation.

Thus at step R-1, the Host 4 transmits a Read Command to the Channel Interface Module (CIM) $8_{c1}$, or $8_{c2}$ (FIG. 1A).

In R-2, the protocol chip I-1, conveys this command to the interface controller, $IP_{c1}$ or $IP_{c2}$(FIG. 1A).

In step R-3, the interface processor ($IP_{c1}$, $IP_{c2}$) transfers the command to the Buffer 24.

At step R-4, the control processor ($10_{c1}$, $10c2$) takes the Read Command from Buffer 24 and transmits the command through Future bus interface FBi (31) to the Device Interface Module (DIM) $8_{d1}$, or $8_{d2}$.

At step R-5, the Future bus interface FB1 (31) transfers the Read Command to the Buffer 24.

At step R-6, the DIM control processor ($10_{d1}$ or $10_{d2}$) sends the Read Command, through interface processor $IP_{d1}$, $IP_{d2}$ and the device interface $D_1$ ($D_{1a}$, $D_{1b}$, $D_{1c}$, $D_{1d}$) to the peripheral storage Disk Drive 70.

At step R-7, the Disk Drive 70 "Reads" the requested data from disk and generates a status signal. The data and status signal are transmitted, via device interface D1 ($D_{1a}$, $D_{1b}$, $D_{1c}$, $D_{1d}$) and interface controller $IP_{d1}$ or $IP_{d2}$, to the Buffer 24 (DIM) ($24_{d1}$ or $24_{d2}$) (FIG. 1A).

At step R-8, the DIM control processor $10d$ ($10_{d1}$ or $10_{d2}$) performs a "status check" to see that the proper data was retrieved.

At step R-9, the DIM control processor $10_d$ transmits the checked-out data and the status information, via Future bus interface $FB_2$ (32) to the Channel Interface Module CIM ($8_{c1}$ or $8_{c2}$).

In step R-10, the Future bus interface FB2 (32) continues to implement step R-9 by placing the data and status information in the CIM buffer $24c$ ($24_{c1}$, and $24_{c2}$).

At step R-11, the CIM control processor $10c$ ($10_{c1}$ or $10_{c2}$) takes the data and status information from the buffer 24 ($24_{c1}$ or $24_{c2}$) and conveys it to the interface controller ($IP_{c1}$ or $IP_{c2}$).

Then at step R-12, the CIM interface controller ($IP_{c1}$ and $IP_{c2}$) transmits the accessed data and status information via the protocol interface (I-1, or I-2) to the host computer 4.

Figure 12:
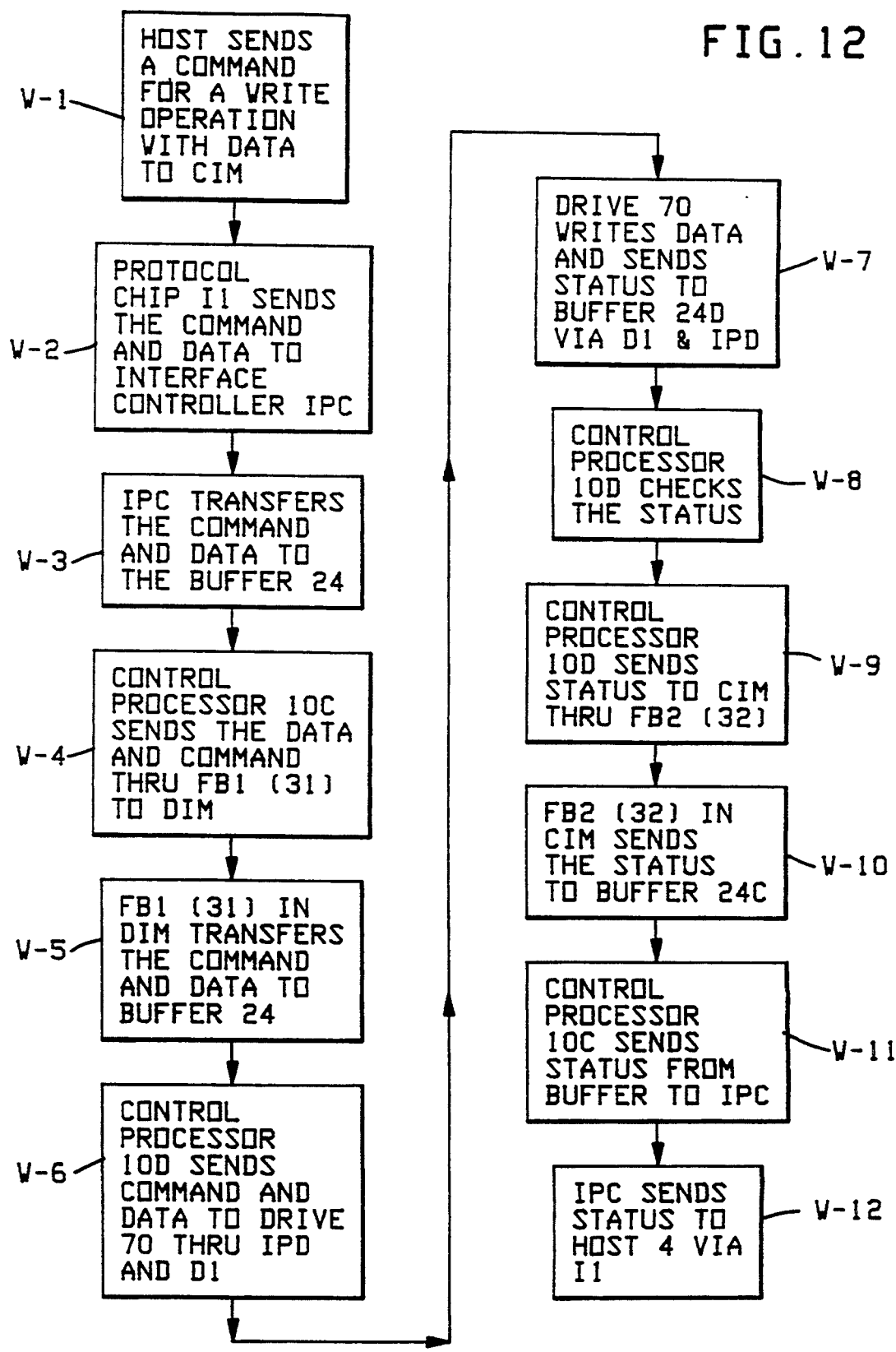
FIG. 12 is a flow chart showing the various steps involved in the system for a Write and Status operation.

Now referring to FIG. 12, there is seen a flow chart illustrating the steps involved in a WRITE operation to an addressed peripheral disk unit 70 (70a ... 70d, etc.).

At step W-1, the Host processor 4 (4a ... 4d) sends a WRITE command which includes the data to be written and also the address of the disk and its cylinder and sector. This command and data is conveyed to the Channel Interface Module (CIM $8_{c1}$ or $8_{c2}$).

At step W-2, the (CIM) protocol chip (I-1, I-2) receives the command and data for transmittal to the interface processor ($IP_{c1}$, $IP_{c2}$).

At step W-3, the interface processor ($IP_{c1}$, $IP_{c2}$) transfers the Write Command and data to the Buffer 24c ($24_{c1}$ or $24_{c2}$).

At step W-4, the CIM Control Processor ($10_{c1}$, or $10_{c2}$) sends the Write Command and data, via the bus $12_3$ (FIG. 2), over the Future bus interface FB (FB1, 31; FB2, 32) to the device interface module, (DIM $8_{d1}$, $8_{d2}$).

In step W-5, the Future bus interface (31, 32) in the DIM module ($8_{d1}$, $8_{d2}$) (FIG. 2) transfers the Write Command and data to the DIM buffer ($24_{a1}$, $24_{a2}$).

Then at step W-6, the DIM control processor ($10_{a1}$, or $10_{a2}$) sends the Write Command and data to the addressed disk unit 70 (70a ... 70d) by routing it through the interface processor ($IP_{d1}$ or $IP_{a2}$) over to the device interface D1 of the DIM.

At step W-7, the selected disk drive unit (70 etc.) writes the data into the addressed cylinder and sector then sends a "Status" signal (to indicate completion) to the DIM Buffer 24d ($24_{d1}$, $24_{d2}$). This is done via the DIM device interface $D_1$ and the interface processor ($IP_{d1}$, $IP_{d2}$).

In step W-8, the DIM control processor ($10_{d1}$, or $10_{d2}$) checks the "status" signal for completion of the Write Command.

At step W-9, the DIM control processor ($10_{d1}$, $10_{d2}$) transmits the status signal information to the Channel Interface Module, CIM ($8_{c1}$ or $8_{c2}$) by routing through the DIM Future bus interface ($FB_1$, 31) ($FB_2$, 32) and the CIM Future bus ($FB_1$, 31) interface ($FB_2$, 32).

At step W-10, the Future bus interface ($FB_2$, 32) transmits the status information to CIM Buffer ($24_{c1}$, $24_{c2}$).

At step W-11, the CIM control processor ($10_{c1}$, $10_{c2}$) accesses the CIM Buffer ($24_{c1}$, $24_{c2}$) and transfers status to the CIM interface processor ($IP_{c1}$, $IP_{c2}$).

At step W-12, the CIM interface controller ($10_{c1}$, $10_{c2}$) transmits the status information (command complete or not complete) via the CIM interface protocol unit (I-1, I-2) to the host computer 4 (4a, 4b, 4c, 4d).

The described mass storage system is seen to use a highly efficient buffer memory system in the channel interface modules and device interface modules. An Address Transfer System and a Data Transfer System of buffer memory provides four input/output ports to each interface controller module (CIM, DIM).

This arrangement makes it possible for any one of the multiple ports to function on a Read operation, a Write operation, or a status operation simultaneously with activities occurring on each of the other ports. As a result of this, there is a "fairness" or equality of access among the ports to the memory modules and also a high speed series of data communication and data transfer operations which can occur in the system.

While the concepts discussed in the buffer memory involved the use of four ports and four memory modules, the same concepts can lend themselves for expansion on a larger scale without any loss of speed. For example, a scaled up version could involve 16 ports for the buffer memory system which would include 16 separate memory modules. In this configuration, all the advantages of low power dissipation, minimal amount of board space, rapidity of data transfer and simultaneity of Reading and Writing operations could still be operative and functional without any loss in speed compared to the four port system.

Described herein has been a highly reliable, transfer rate efficient, system for storage and retrieval of massive amounts of data using various types of peripheral storage devices such as disk, tape, optical drive, and cache memory.

A single host system or plurality of host systems may be connected to a plurality of channel interface modules (CIMs) which carry commands and data between the host system and a dual set of Futurebus interface lines. Additionally connected to the Futurebus interface lines is a peripheral device interface module (DIM) which provides control and interconnections between the peripheral storage devices and the Futurebus interface lines of the channel interface module (CIM). Each of the controllers of the channel interface module and the device interface module is provided with a buffer memory system having multiple memory modules and multiple ports which permit simultaneous and concurrent reading and writing of data with a highly rapid massive data transfer capability.

Additionally each of the modules in the subsystem is provided with live replacement and redundancy capability such that any failure of a single unit will be taken over by an additional redundant unit until such time as repairs or corrections have been made to the faulting unit.

While one preferred embodiment of the system concept has been described herein, other configurations based on the concept may also be implemented yet be encompassed by the following claims.

What is claimed is:

1. A system for high speed storage/retrieval of massive amounts of data on peripheral devices comprising:
   (a) host computer means for commanding execution of storage/retrieval functions to/from a plurality of peripheral devices and for selecting viable data communication pathways via selected ones of a plurality of first controller interface means, dual bus means and a plurality of second controller interface means;
   (b) said plurality of first controller interface means for control and management of said host computer means commands, each said first controller interface means including:
      (b1) first buffer memory means for holding data in transit between said host computer means and said peripheral devices and including:
         (b1a) M port means connected to M memory modules for enabling access to any address location in any one of said M memory modules and enabling simultaneous read and write operations into and out of any one of said M memory modules, said M port means connecting said host computer means to said dual bus means;
   (c) dual bus means for enabling communication between said plurality of first controller interface means and said plurality of second controller interface means;

(d) said plurality of second controller interface means receiving commands from said first controller interface means, and for selecting a peripheral device for data transfer operations each said second controller interface means, including:

(d1) a second buffer memory means which physically duplicates the M ports and M memory modules of said first buffer memory means and which connects said peripheral devices to said dual bus means;

(e) said plurality of peripheral devices for storing massive amounts of data and wherein each peripheral device has two ports each of which is connected to a different one of said second controller interface means.

2. The system of claim 1 wherein said first controller interface means includes:

(a) means to enable host commands, data and status messages for temporary storage and transfer between said host computer means and said dual bus means.

3. The system of claim 3 wherein said second controller interface means includes:

(a) means to temporarily store and transfer host commands, data and status messages between selected peripheral storage devices and said dual bus means.

4. The system of claim 1 wherein said host computer means includes:

(a) a plurality of host computer units each of which is connected to said first controller interface means;

(b) a plurality of said first controller interface means wherein each one of said first controller interface means includes:

(b1) connecting means to said dual bus means;

(b2) means to reconfigure communication through a single bus after detecting failure of the other bus in said dual bus means.

5. The system of claim 1 wherein said dual bus means includes:

(a) means to provide a multiplicity of communication channels between any one of said plurality of first controller interface means and any one of said plurality of second controller interface means wherein said communication channels transfer data concurrently and simultaneously between said first and second buffer memory means.

6. A high speed storage/retrieval system comprising;

(a) host computer means for instructing execution of data storage/retrieval operations;

(b) first interface means for temporary storage of instructions, data and status information and transferring information between said host computer means and a dual bus means, said first interface means including;

(b1) a plurality of duplicate units of said first interface means connected to said dual bus means;

(c) said dual bus means providing parallel redundant data transfer channels between said first interface means and a second interface means;

(d) said second interface means for temporary storage of said instructions, data and status information and enabling communication transfers to/from selected peripheral storage devices, said second interface means including:

(d1) a plurality of duplicate units of said second interface means connected to said dual bus means;

(e) wherein each said first and second interface means includes a buffer memory means having M ports;

(f) said buffer memory means for temporary storage of commands and data in M memory modules and including:

(f1) M ports for enabling simultaneous Read and Write operations through said M ports.

7. The system of claim 6 wherein said host computer means includes:

(a) means to detect a malfunctioning bus and malfunctioning interface means in said system;

(b) means to reconfigure said system to enable an operable first or second interface means and an operable bus bus in said dual bus means to execute the functions of any malfunctioning bus and/or interface means.

8. The system of claim 7 wherein said first and second interface means each include:

(a) error checking means in said plurality of first and second interface means for reporting malfunctions to said host computer means when any one of said plurality of first interface means or second interface means or bus in said dual bus means is inoperative.

9. A system for enabling data transfers between a host computer means and a plurality of peripheral devices while providing redundancy and universal interconnectivity, said system comprising:

(a) a plurality of channel interface modules for providing a plurality of data transfer channels between a plurality of device interface modules and said host computer means;

(b) a plurality of device interface modules for providing a plurality of data transfer means between said plurality of channel interface modules and said plurality of peripheral devices;

(c) dual bus means connecting each of said plurality of channel interface modules to each of said plurality of device interface modules;

(d) wherein each of said channel interface modules and each of said device interface modules includes;

(d1) a multiported buffer memory means having M ports for temporary storage of data in transit and which includes:

(d1a) a plurality of M internal memory modules;

(d1b) means for distributing any incoming address to each of said M ports concurrently;

(d1c) means for simultaneously reading from or writing to any one or all of said M internal memory modules.

(d2) checking means to detect any malfunctioning bus or interface module for signalling said host computer means:

(e) said host computer means including a plurality of host computers connected to said channel interface modules wherein each host computer includes:

(e1) means to detect a malfunctioning bus or malfunctioning interface module;

(e2) means to select a viable communication pathway for data transfer operations to said peripheral devices.

10. In a network for enabling "M" host computer means to execute data transfer operation to/from a plurality of peripheral devices, a system for providing alternate multiple paths between said host computer means and peripheral devices, comprising:
- (a) dual system bus means connecting a plurality of first controller interface means to a plurality of second controller interface means;
- (b) each said first controller interface means for managing the storage and transfer of data between each pair of said host computer means and said dual system bus means;
- (c) each said second controller interface means for managing the storage and transfer of data between said dual system bus means and said peripheral devices;
- (d) wherein each said first and second controller interface means includes:
  - (d1) buffer memory means having M ports and M memory modules for enabling access to any address location in any one of said M memory modules and enabling simultaneous read and write operations to/from each one of said M ports, said M ports providing connections to/from said dual system bus means and to/from said host computer means or said peripheral devices;
  - (d2) control processor means for sensing and utilizing any one of the viable communication paths facilitating said data transfer operations.

* * * * *